United States Patent [19]
Kinba et al.

[11] Patent Number: 5,597,999
[45] Date of Patent: Jan. 28, 1997

[54] AUTO FOCUS DETECTING DEVICE COMPRISING BOTH PHASE-DIFFERENCE DETECTING AND CONTRAST DETECTING METHODS

[75] Inventors: Akio Kinba, Suita; Masataka Hamada, Osakasayama; Hiroshi Ueda, Habikino; Kazumi Sugitani, Yao; Hiroshi Ootsuka, Sakai, all of Japan

[73] Assignee: Minolta Co., Ltd., Osaka, Japan

[21] Appl. No.: 582,026

[22] Filed: Jan. 2, 1996

Related U.S. Application Data

[63] Continuation of Ser. No. 284,077, Aug. 1, 1994, abandoned.

[30] Foreign Application Priority Data

Aug. 2, 1993 [JP] Japan .................................. 5-211001

[51] Int. Cl.⁶ .................................................. G03B 13/00
[52] U.S. Cl. .................................... 250/201.7; 250/201.8; 396/125
[58] Field of Search ........................ 250/201.7, 201.8, 250/201.2, 559.38; 354/408, 407, 406, 402

[56] References Cited

U.S. PATENT DOCUMENTS

| | | | |
|---|---|---|---|
| 4,341,953 | 7/1982 | Sakai et al. | 250/204 |
| 4,833,315 | 5/1989 | Horikawa | 250/201.7 |
| 4,835,562 | 5/1989 | Norita et al. | 354/408 |
| 4,949,106 | 8/1990 | Igarashi | 353/25 |
| 4,951,078 | 8/1990 | Okada | 354/402 |
| 5,005,967 | 4/1991 | Kuriyama | 353/101 |
| 5,159,377 | 10/1992 | Suzuki et al. | 354/400 |
| 5,241,167 | 8/1993 | Suzuki et al. | 250/201.8 |
| 5,283,607 | 2/1994 | Suzuki et al. | 354/400 |
| 5,325,146 | 6/1994 | Toji | 354/402 |
| 5,333,028 | 7/1994 | Akashi et al. | 250/201.8 |

FOREIGN PATENT DOCUMENTS 1-208971  8/1989  Japan .

*Primary Examiner*—Edward P. Westin
*Assistant Examiner*—John R. Lee
*Attorney, Agent, or Firm*—Brinks Hofer Gilson & Lione

[57] ABSTRACT

An auto focus detecting device capable of focus detection by a contrast detecting method and a phase-difference detecting method. In accordance with a condition of an object, either one of detecting method is selected, and then an amount of defocus is calculated based on a result obtained by the selected detecting method.

20 Claims, 25 Drawing Sheets

Fig. 16
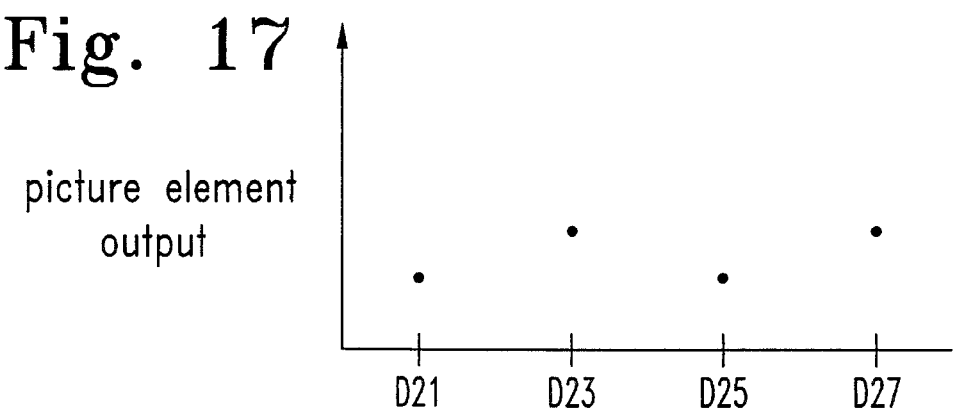
Fig. 17
picture element output
Fig. 18
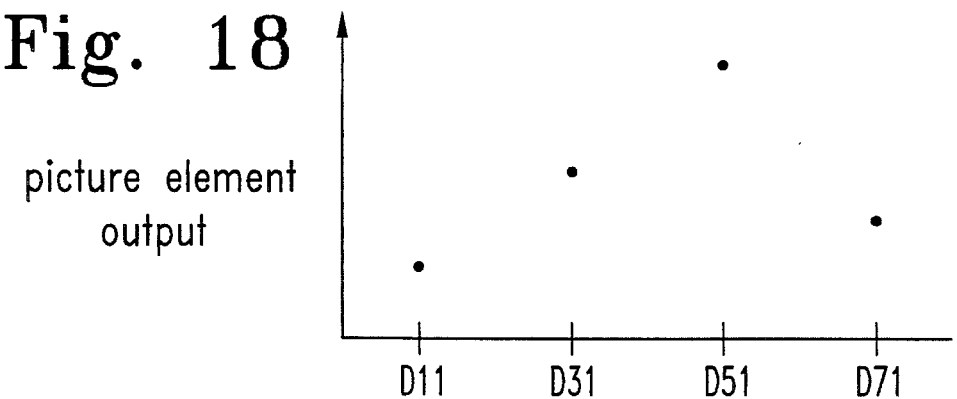
picture element output
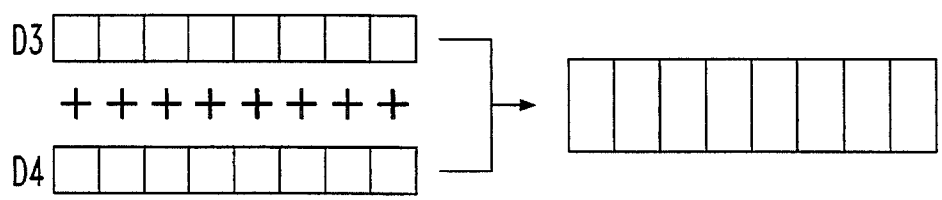
Fig. 19

AUTO FOCUS DETECTING DEVICE COMPRISING BOTH PHASE-DIFFERENCE DETECTING AND CONTRAST DETECTING METHODS This application is a continuation of application Ser. No. 08/284,077, filed Aug. 1, 1994 now abandoned.

BACKGROUND OF THE INVENTION

The present invention relates to an auto focus detecting device for an auto focus camera.

It is conventionally known an auto focus detecting device by a contrast detecting method wherein a light-receiving sensor is arranged nearby and in front or rear of a focusing screen on which an incident object image through an photographic lens is projected, an amount of defocus is detected by a difference of light amounts of picture elements being next to the object image, and the object image is focused by being a lens driven based on the amount of defocus (for example, Japanese Laid-Open Patent Application No. 55-155308). It is also known an auto focus detecting device by a phase-difference detecting method wherein an amount and a direction of defocus are detected by a phase-difference of an object image reproduced by two divided luminous flux thereof, and the object image is focused by being a lens driven based on the detected result (Japanese Laid-Open Patent No. 4-175619).

However, in focus detecting by contrast detecting method, since a detectable range of the defocus amount is narrow, when a focusing condition is out of focus considerably, it becomes difficult to detect a focus. And, in a focus detection by phase-difference detecting method, although a detectable range of the defocus amount is wide, there is a problem that non-sensitive zone is brought in a focus detecting area.

SUMMARY OF THE INVENTION

An object of the present invention is to solve the above mentioned problems by providing an auto focus detecting device capable of detecting a focus by both contrast detecting method and phase-difference detecting method, even if a focusing position is out of focus considerably, or without non-sensitive zone is brought in large defocus area.

To achieve the above mentioned object, the present invention is provided an auto focus detecting device comprising a focus detecting means consisting of an optics and a light-receiving sensor for focus detection by a phase-difference detecting method, a focus detecting means consisting of an optics and light-receiving sensor for focus detection by a contrast detecting method, and a controlling means which calculates an amount of defocus based on a detected result by using both the former focus detecting means by the phase-difference detecting method and the later focus detecting means by contrast detecting method, and drives a lens to in-focus condition. With a construction as described above, after adjusting in roughly based on a focus detection by the phase-difference detecting method and adjusting in exactly based on a focus detection by the contrast detecting method, a lens is driven to in-focus condition. Also, when focus being not detected in a sensitivity area of the phase-difference detecting method, focus is detected by the contrast detecting method.

BRIEF DESCRIPTION OF THE DRAWINGS

FIG. 16 is a view explaining that a data is taken out from the area sensor.

FIG. 17 is a view showing an example of picture elements output in case of that a data is dumped to a phase-difference direction.

FIG. 18 is a view showing an example of picture elements output in case of that a data is taken out in perpendicular direction to the phase-difference direction every two or three lines.

FIG. 19 is a view explaining that it is possible to calculate distance measuring after adding a plurality of data in perpendicular direction to the phase-difference direction.

DETAILED DESCRIPTION OF THE EMBODIMENT

Figure 1:
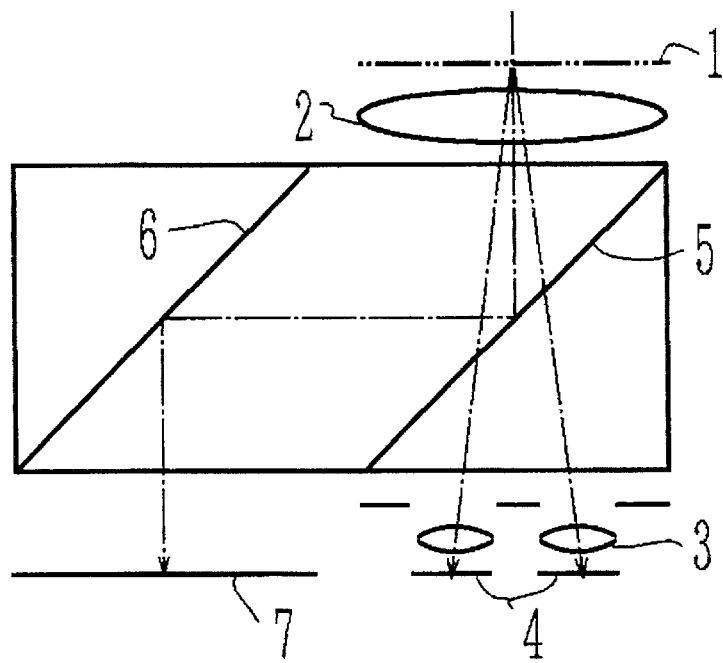
FIG. 1 is a schematic view showing an AF sensor module constituting an auto focus detecting device according to the first embodiment in the present invention.
Figure 2:
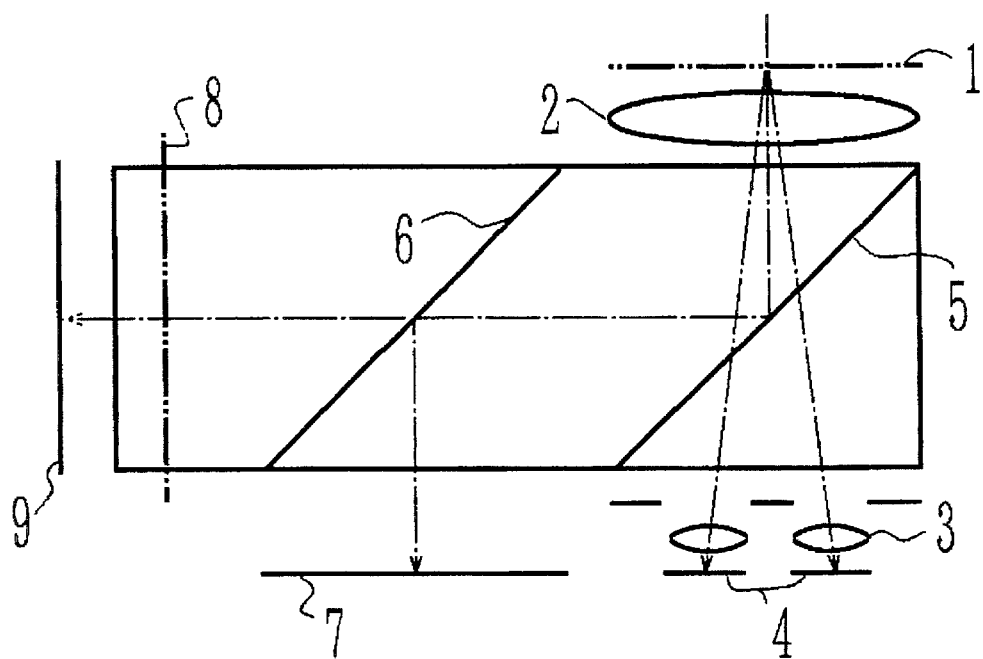
FIG. 2 is a schematic view showing another AF sensor module.

FIG. 1 is a schematic view showing an AF sensor module constituting an auto focus detecting device of an auto focus (AF) camera according to the first embodiment in the present invention. An AF sensor module consists of an optics and a light-receiving sensor for focus detection by a phase-difference detecting method and by a contrast detecting method. A construction for focus detection by the phase-difference detecting method comprises a condenser lens 2 arranged in rear of a film equivalent face 1 on which an object image of a photographic light incident through a photographic lens is formed, which divides the photographic light to two luminous fluxes, two separator lenses 3 which forms a reproducing image from the photographic incident light, and a line sensor 4 such as a CCD which converts the object image to an electric image data. A construction for the focus detection by the contrast detecting method comprises half-mirror 5 and 6 on which a part of the photographic light is reflected and an area sensor 7. FIG. 2 is further added a light metering area sensor 9 for obtaining a exposure control signal, arranged in rear of another film equivalent face 8, to the structure described above.

Figure 3:
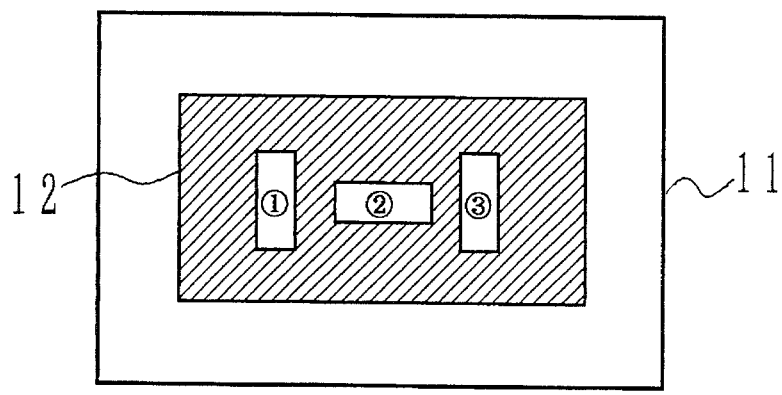
FIG. 3 is a view showing an example of a focus detecting area to a photographic screen.
Figure 4:
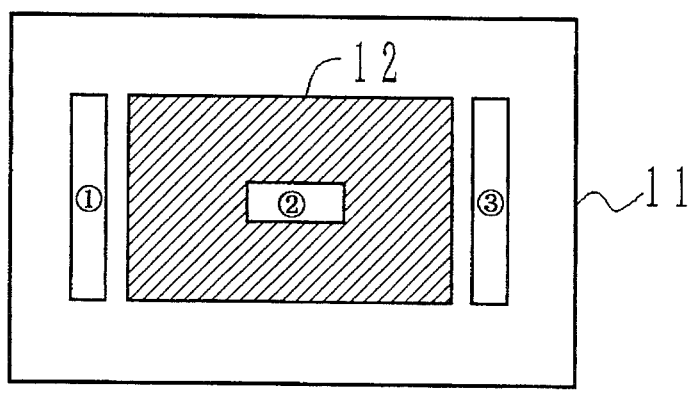
FIG. 4 is a view showing another example of a focus detecting area to the photographic screen.

FIG. 3 and 4 are views showing examples of focus detecting (distance measuring) areas in a photographic screen of an AF camera. Within a viewfinder 11 of the AF camera, hatched part 12 shows a focus detecting area by the contrast detecting method and rectangular part 1, 2 and 3 shows focus detecting area by the phase-difference detecting method. In FIG. 3, the focus detecting area by the phase-difference detecting method is overlapped in the focus detecting area by the contrast detecting method. In FIG. 4, the focus detecting area 1 and 3 by phase-difference detecting method are arranged right and left outside of the focus detecting area by the contrast detecting method.

Figure 5:
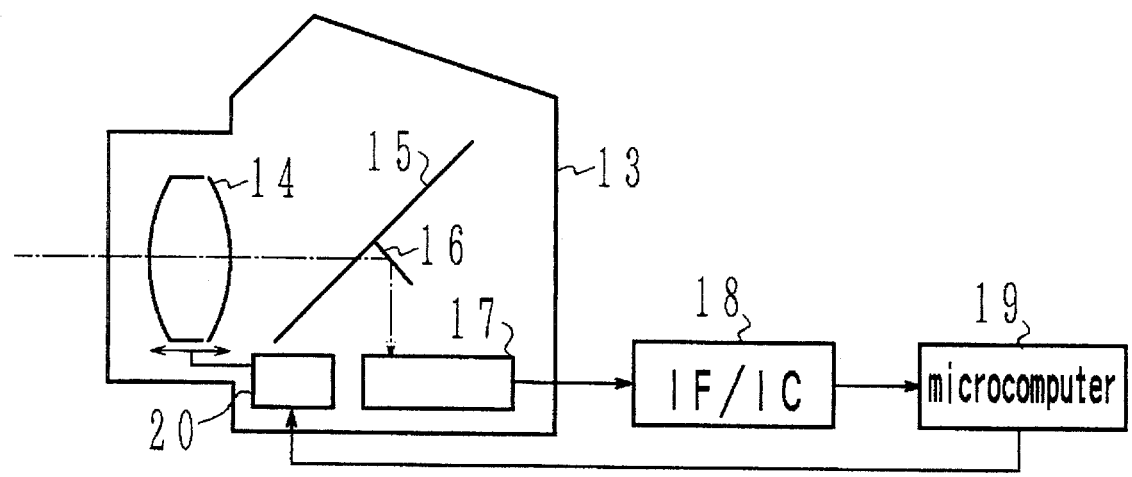
FIG. 5 is a block diagram of the auto focus detecting device in an AF camera.

FIG. 5 is a block diagram of the auto focus detecting device in the AF camera 13. The photographic light through an imaging lens 14 is directed, through a main mirror 15 and a sub-mirror 16, to a CCD 17 within the AF sensor module. Electric charge charged in a CCD 17 in response to an amount of light-receiving is taken in an AF interface IC 18. Range of a picture element outputted from the CCD 17 can be optionally taken out under control of a micro computer 19. An analog data of the electric charge output from the CCD 17 is converted to a digital data by the interface IC 18 and stored in memory. The microcomputer 19 calculates an amount of defocus based on the stored data and drives a focusing lens driving motor 20 for focus operation in accordance with the calculated amount of defocus.

Figure 6:
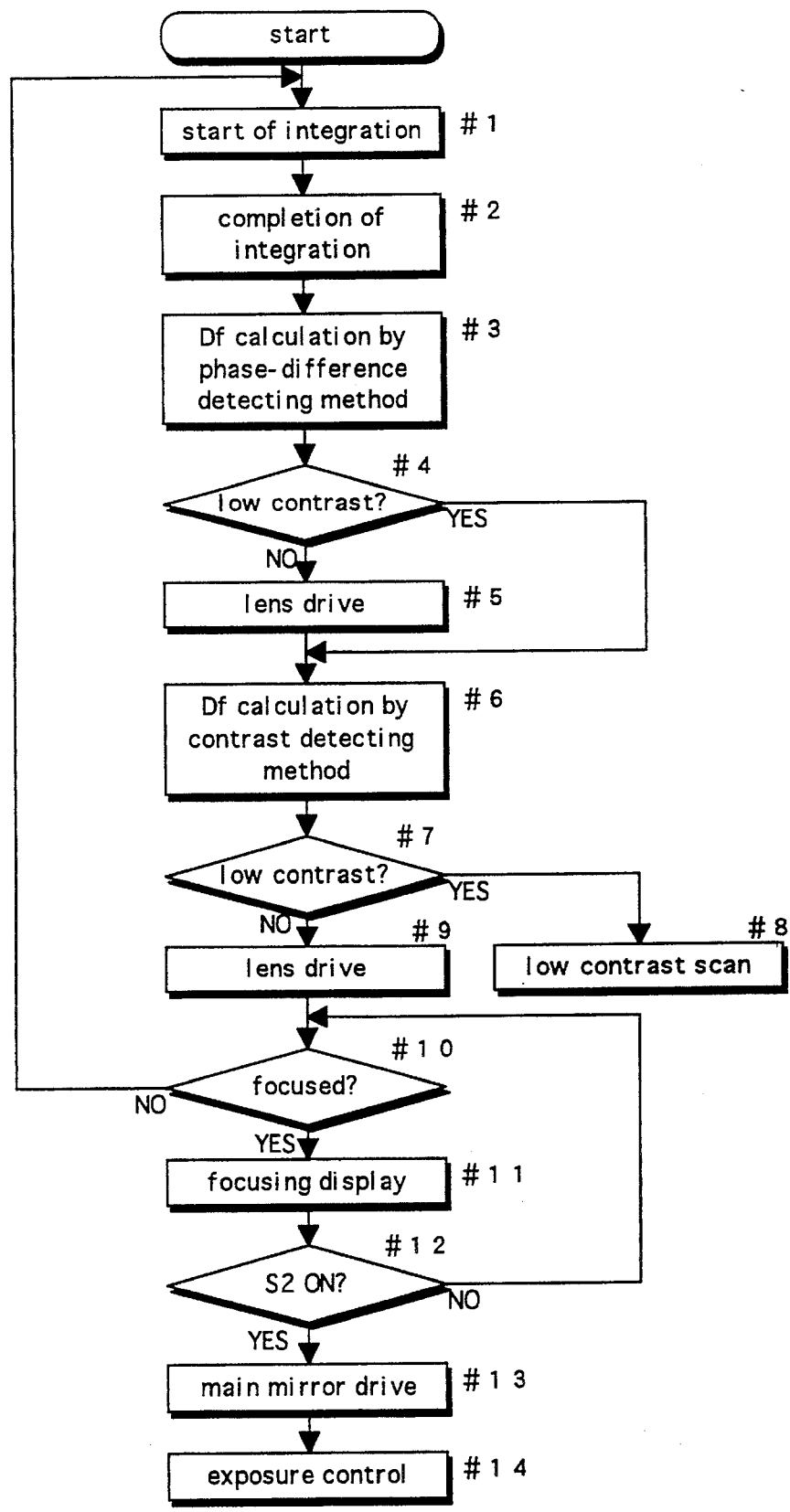
FIG. 6 is a flowchart showing a process of the auto focus detecting device.

FIG. 6 is a flowchart showing a process of the present auto focus detecting device. Starting a process of a distance measurement, integration in the CCD is started at step #1. After completion of predetermined integration at step #2, an amount of defocus (Dr) is calculated by the phase-difference detecting method at step #3. Based on the result, it is judged whether or not it is low contrast at step #4. If no, a lens is driven at step #5, and an amount of defocus is calculated by the contrast detecting method at step #6. If yes at step #4, without driving the lens, the procedure goes to step #6. Based on the result at step #6, it is judged whether or not it is low contrast at step #7. If yes, low contrast scanning is carried out at step #8. If no, the lens is driven at step #9. And it is judged whether or not it is focused at step #10 and if no, the procedure returns to #1. If yes, focusing is displayed at step #11. Till a release switch (S2) is turned ON, the procedure is waited in a loop of in #10–#12. When the release switch is turned ON, a main mirror is driven at step #13 and an exposure control is carried on at step #14.

Figure 7:
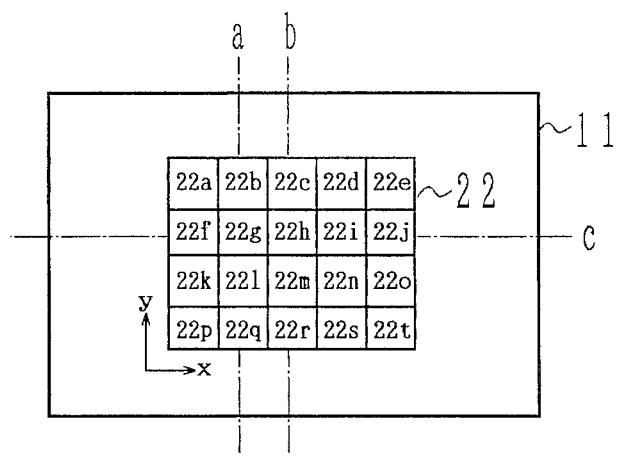
FIG. 7 is a distribution map of a distance measuring area at a multiple points by an area sensor within a viewfinder.
Figure 8:
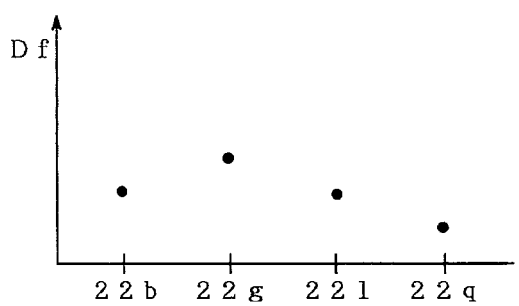
FIG. 8(a), (b) and (c) are views showing a distribution of an amount of defocus on lines a,b and c in FIG. 7.
Figure 8:
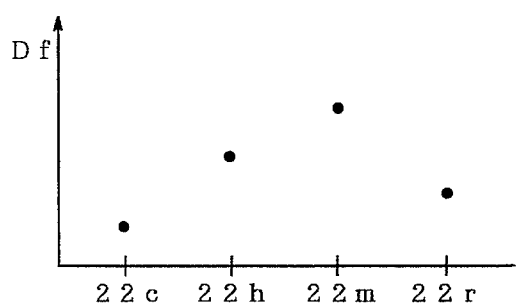
Figure 8:
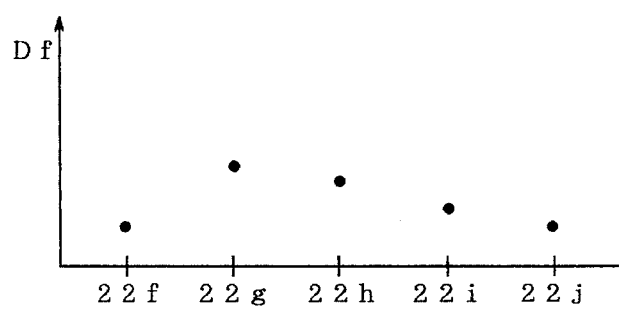
Figure 9:
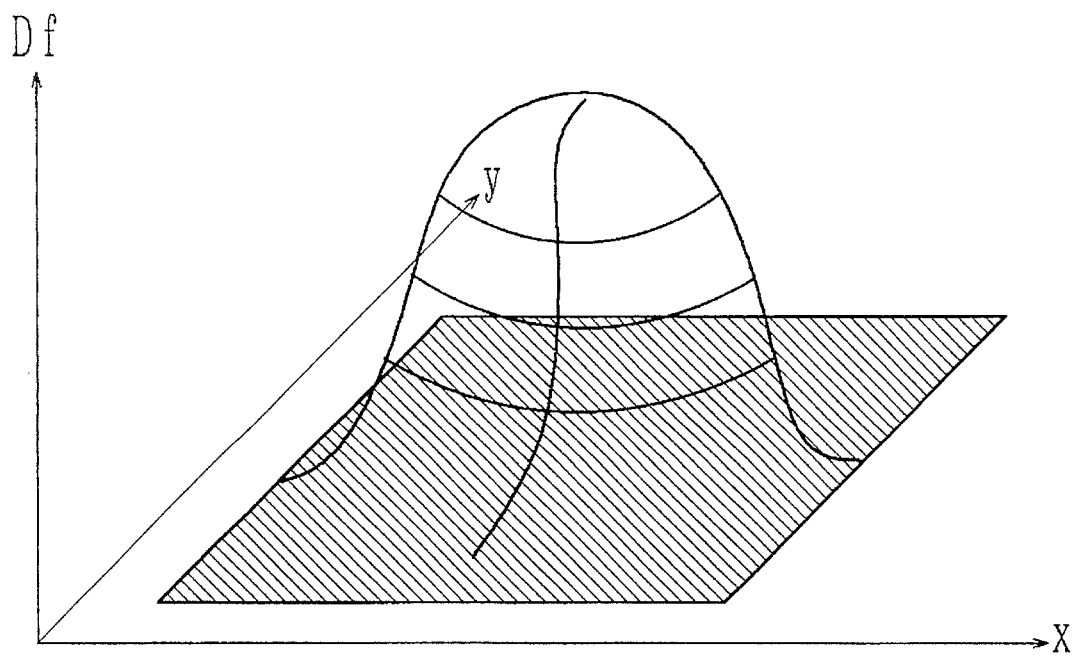
FIG. 9 is a view showing a three-dimensional distribution of an amount of defocus.

FIG. 7 shows a distribution of an distance measuring area at a multiple points by an area sensor within the viewfinder 11. A distance measuring area (focus detection) 22 occupies relatively an area more than one forth area of the viewfinder 11, namely, vertical and horizontal length more than one second length of the viewfinder 11. Also, as shown in FIG. 7, the distance measuring area is divided to a plurality of distance measuring areas 22a–22t. The measuring distance data (amount of defocus) is stored by each distance measuring area and the main object is detected based on the distribution data of distance measuring. FIG. 8(a), (b) and (c) show a distribution of an amount of defocus on line a, b and c, and FIG. 9 shows a three-dimensional distribution of the amount of defocus. Also, if a camera is provided a switch for changing over distance measuring area, data of only distance measuring area selected by the switch is read out from the area sensor, the focusing lens is driven based on the data and focusing can be carried out.

Figure 10:
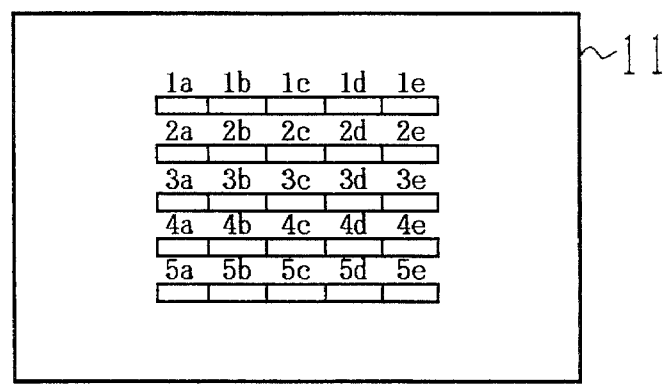
FIG. 10 is a view showing an distribution of a distance measuring area at a multiple of points by a line sensor within the viewfinder.

FIG. 10 shows a distribution of distance measuring area at a multiple points by a line sensor within the viewfinder 11. An island is divided to a plurality of blocks and distance measuring value is calculated from each blocks. Also, if a camera is provided a switch for fixing a distance measuring area, a distance measuring area can be fixed by the switch.

Figure 11:
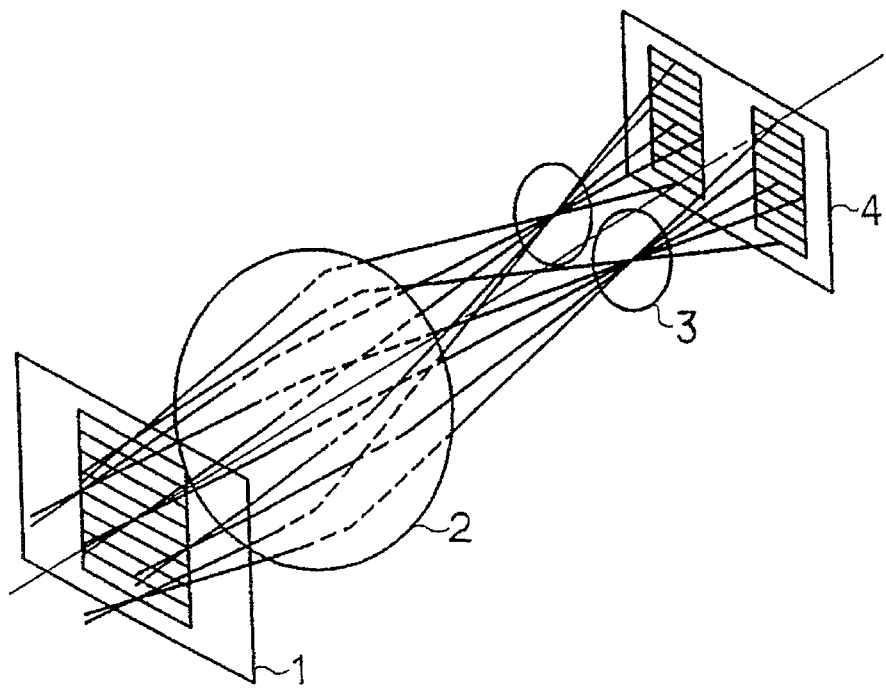
FIG. 11 is a perspective view showing an optics for focus detecting by the phase-difference detecting method at a multiple points.

FIG. 11 shows an optics for focus detection by the phase-difference detecting method in a multiple points. The optics comprises the condenser lens 2 arranged in rear of the film equivalent face 1 on which an object image of a photographic light incident through the photographic lens is formed, the separator lens 3 and the CCD 4 including a standard part and a reference part. A frame described in the film equivalent face 1 shows imaginatively a plurality of divided focus detecting areas.

Figure 12:
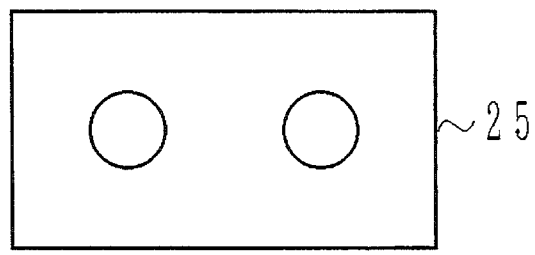
FIG. 12 is a front view showing an aperture mask for the optics of focus detecting by the phase-difference detecting method.
Figure 13:
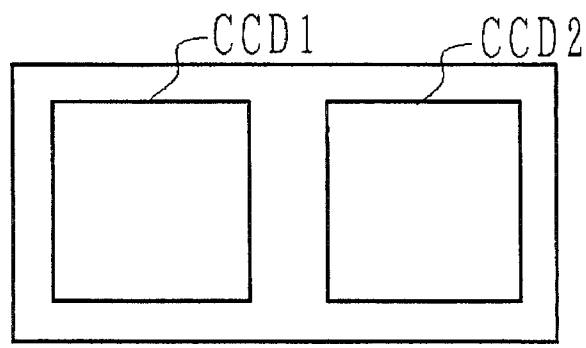
FIG. 13 is a view showing an example in which two CCD are put on one tip.
Figure 14:
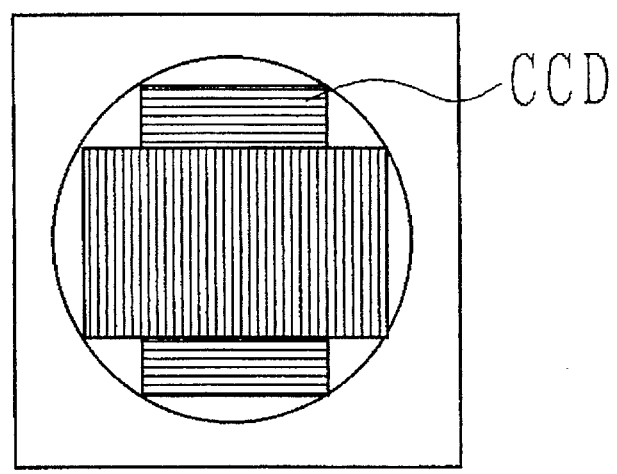
FIG. 14 is a view showing an example in which CCD is arranged on only an illuminated circular part of the tip.
Figure 15:
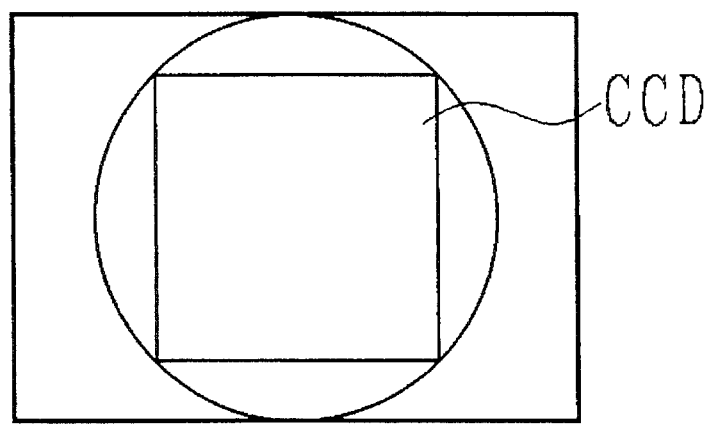
FIG. 15 is a view showing an example of construction of the AF optics for illuminating whole CCD.

FIG. 12 shows an aperture mask for the optics of a focus detection by the phase-difference detecting method. The aperture mask 25 arranged in front of the separator lens 3 regulates the luminous flux forming an image on the CCD 4. In the present embodiment, light transmitting parts are shaped to a circle. The aperture mask prevents light from straying. FIG. 13 shows an example in which two CCD (CCD1 and CCD2) for the phase-difference detecting method are put on one tip. FIG. 14 shows an example in which, in case of using the aperture mask, CCD is arranged on only an illuminated circular part of the tip. FIG. 15 shows an example of construction of an AF optics for illuminating whole CCD.

FIG. 16 is a view explaining situation wherein data is taken out from the area sensor in focus detection by the phase-difference detecting method. The data is dumped to a phase-difference direction and the data is taken out every other point or every two or three points, and output only from line having a difference among picture elements output except for a part of dark output corresponding to a low luminance object is calculated for distance measuring (focus detecting). By this process, more precise distance measurement is obtained. Also, in FIG. 16, only one area sensor is shown, however, an equivalent two area sensors like this are arranged side by side, and each of them constructs the standard part and the reference part.

FIG. 17 shows an example of picture elements output in case of that data is dumped to the phase-difference direction. Also, FIG. 18 shows an example of picture elements output in case of that data is taken out in a perpendicular direction to phase-difference direction every two or three lines. With taking an absolute value of the difference in the perpendicular direction, an area of dark output corresponding to a low luminance object is not calculated. In addition, data from only one line is described in FIGS. 17 and 18 respectively, in practice, data from a plurality of lines are calculated. Also, FIG. 19 shows that it is possible to calculate distance measurement after adding a plurality of data in a perpendicular direction to the phase-difference direction.

Figure 20:
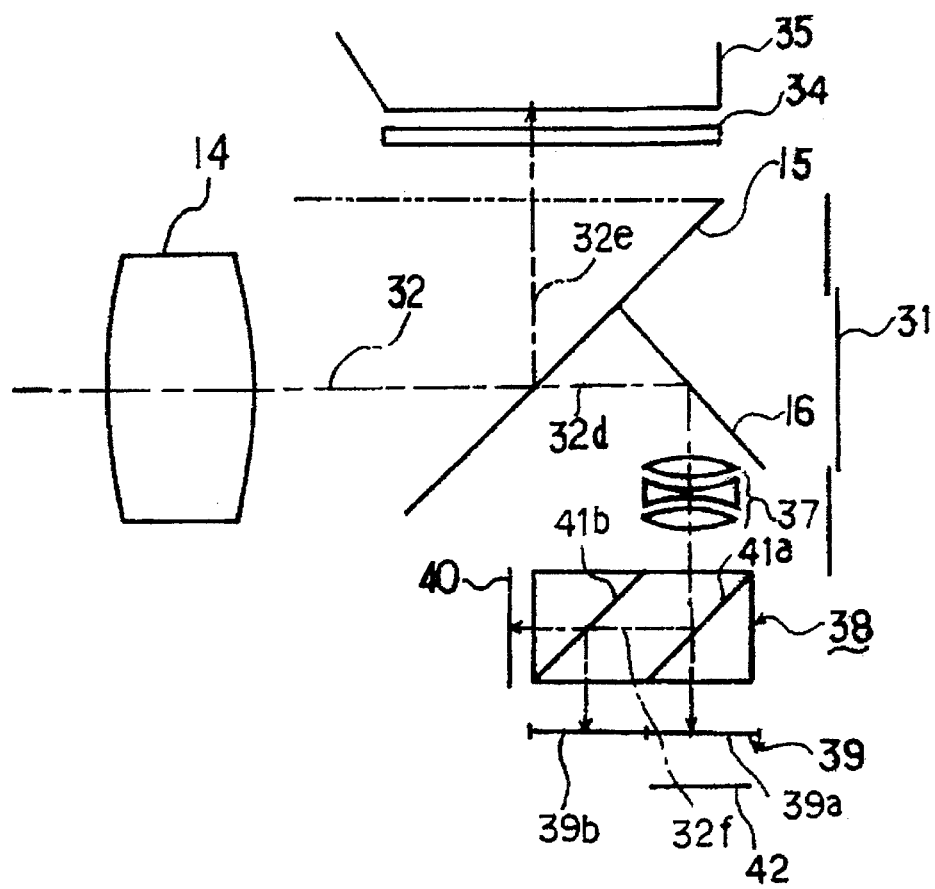
FIG. 20 is a view showing a construction of focus detecting by the contrast detecting method according to the second embodiment.

Next, the second embodiment of the present invention is explained. In the present embodiment, explanation concerning a construction for focus detection by the phase-difference detecting method is omitted and a construction for focus detection by the contrast detecting method used together with the phase-difference detecting method is only explained. Compared with focus detection by the phase-difference detecting method, by the contrast detecting method, focus detection in larger area can be achieved, and in the present embodiment, a direction of defocus can be detected. FIG. 20 shows a construction for focus detection by the contrast detecting method in a single-lens reflex AF camera according to the second embodiment. In FIG. 20, a photographic light 32 transmitting through a photographic lens 14 is divided to two by a quick return mirror 15 and a reflected light 32e is directed to a viewfinder optics consisting of a focusing screen 34, arranged in equivalent position with a face of film 31, and a pentagonal prism 35. While, a light 32d transmitting through the quick return mirror 35 is directed to down below focus detecting device (AF sensor module) with reflecting by a sub-mirror 16. The focus detecting device is constructed by an image reproducing lens 37, an optics for dividing optical path 38, an area sensor 39 (hereinafter referred to CCD) and a metering light sensor 40.

Figure 22:
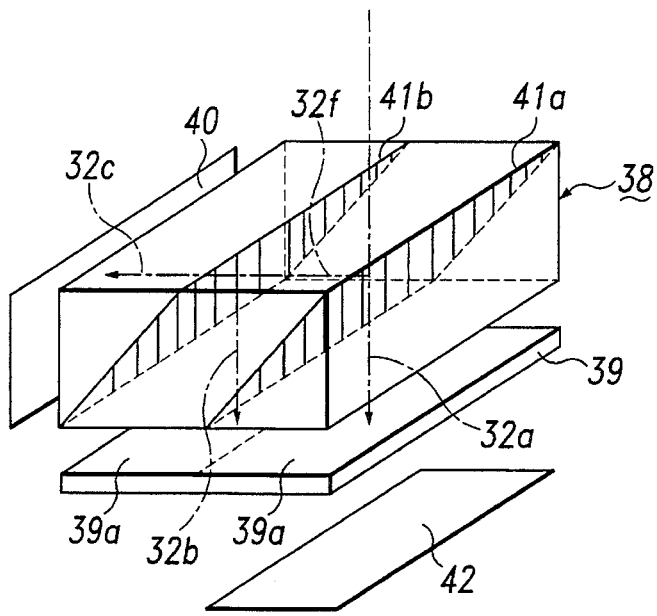
FIG. 22 is a perspective view showing details of the optics for dividing optical path.

Details of the optics for dividing optical path 38 is explained accompanying with FIG. 22. The light 32d reflected on the sub-mirror 16 transmits through the image reproducing lens 37 and is divided to a light 32a and a light 32f by a half mirror 41a. The light 32a transmitting through the half mirror 41a is directed to a CCD 39a, and the light 32f reflected on the half mirror 41a is divided to a light 32b reflected on a half mirror 41b and a light 32c transmitting through the half mirror 41b. The light 32b reflected on the half mirror 41b is directed to a CCD 39b and the transmitting light 32c is directed to a metering light sensor 40. The CCD 39a and 39b are arranged so as to form imaginatively an image reproducing face 42 between them concerning to a length of an optical path. By this construction, a direction of defocus (Df) is detected without driving the CCD 39a, 39b or a lens.

Figure 21:
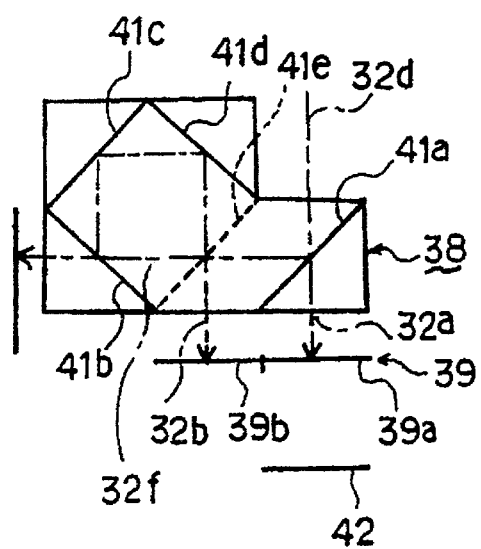
FIG. 21 is a view showing another example of an optics for dividing optical path according to the second embodiment.

FIG. 21 shows another example of the optics for dividing optical path 38, in which a difference of length of divided optical path is extended. This is used in case of that, even if the optics for dividing optical path 38 is used as shown in FIG. 20, a direction of defocus can not be detected by the contrast detecting method. On moving a mirror 41e, the light 32f reflected on the half mirror 41a is reflected on the half mirror 41b, and a mirror 41c and 41d, and incident on the CCD 39b. In such a manner, the length of the optical path is extended and, if focusing point is on direction of the CCD 39b, an amount of defocus get smaller and a direction of defocus is detected. The other, in case of that an amount of defocus is large on side of the CCD 39b, it is clear that focusing point is on opposite side. Accordingly, even if the amount of defocus is large, the direction of defocus can be detected.

Figure 23:
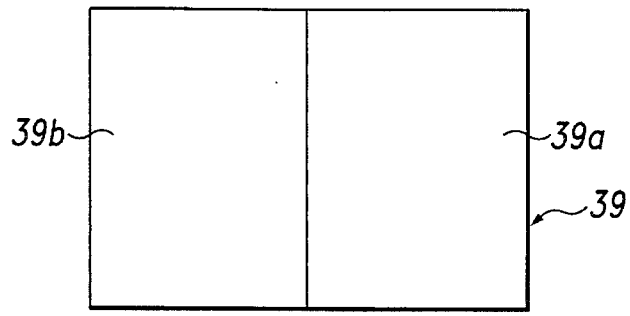
FIG. 23 is a view showing the area sensor divided to two.
Figure 24:
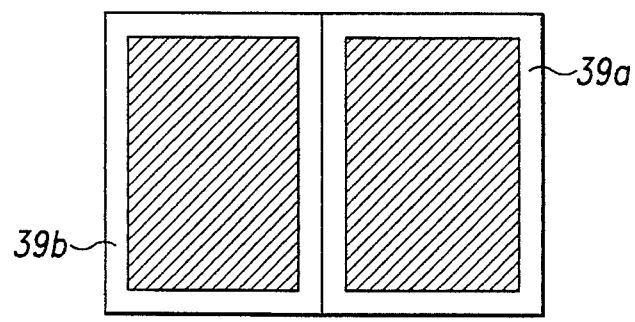
FIG. 24 is a view showing a range in which an image is formed by the area sensor.

Also, the CCD 39a and 39b in FIGS. 20 and 21 need not two area sensors but one area sensor divided to two. Then, one area sensor brings an effect of two area sensors. When two area sensors being used, each sensor must be adjusted, however, when one area sensor being used, only one sensor is adjusted, so it is easy to adjust and make a low cost. But, when an area sensor, as described in FIG. 23, being divided to two, nearby a boundary between the CCD 39a and the CCD 39b, it may occurs due to a difference in production that light to illuminate the CCD 39a illuminates the CCD 39b or light to illuminate the CCD 39b illuminates the CCD 39a vice versa. Therefore, as shown in FIG. 24, by being predetermined to form an image on two areas (hatched part) which is smaller than a range divided to two, each area is not disturbed. And, the metering light sensor 40 is also monitor for integration control of the CCD 39a and 39b.

Figure 25:
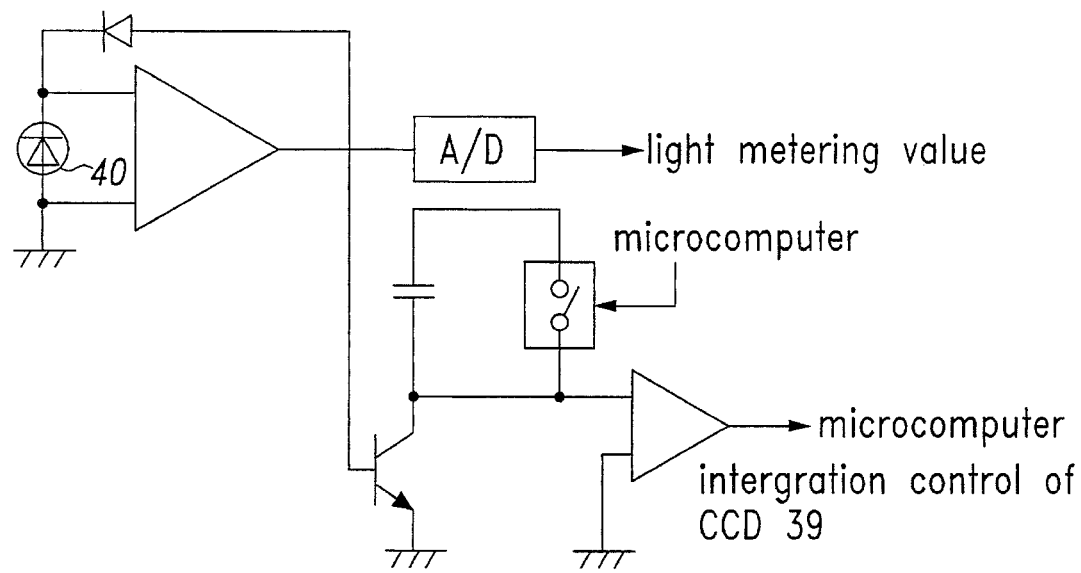
FIG. 25 is a schematic view of a metering light circuit.

FIG. 25 is a schematic view of the metering light circuit including the metering light sensor 40. An analog-to-digital converted value of a signal which is obtained by output from the light metering sensor 40 is used as a signal for exposure control and inputted to the microcomputer as a monitoring signal for integration control of the CCD 39a and 39b.

Figure 26:
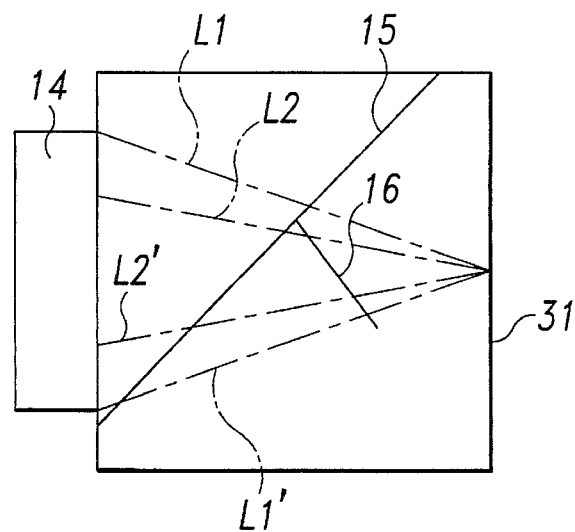
FIG. 26 is a view explaining a vignetting of an optical path by F-stop number of an imaging lens.
Figure 28A:
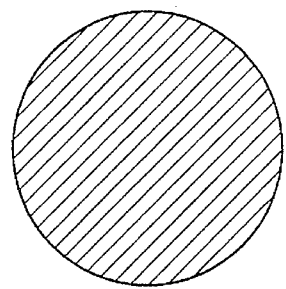
FIG. 28(a) and (b) are views showing an unsharp on CCD in cases of the vignetting of luminous flux is brought or not.
Figure 28B:
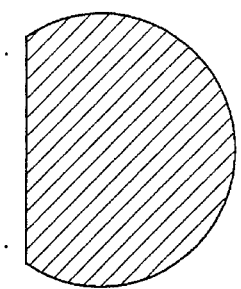

Next, a vignetting of the optical path by F-stop number of an imaging lens is explained accompanying with FIG. 26. In case of using a lens having a large F-stop number, all of light ray L2' passing through the bottom of luminous flux and a light ray L2 passing through the top of luminous flux L2 are directed to AF sensor module with reflecting on the sub-mirror 16. To the contrary, in case of using a lens having a small F-stop number, a light ray L1' passing through the bottom of luminous flux is directed to AF sensor module with reflecting on sub-mirror 16, but a light ray passing through the top of luminous flux is not directed to AF sensor module because of not reflecting on the sub-mirror 16. So, in case of using a lens having a large F-stop number, since the luminous flux is not vignetted, it is unsharped as shown in FIG. 28(a) in defocus condition. While, in case of using a lens having a small F-stop number, since a part of the luminous flux is vignetted, it is unsharped as shown in FIG. 28(b).

Figure 27:
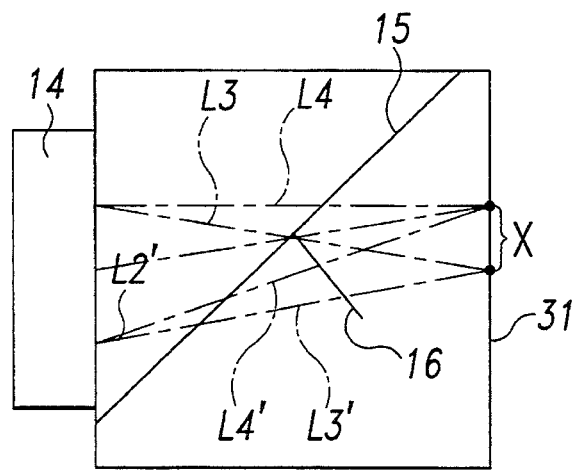
FIG. 27 is a view explaining the vignetting of luminous flux brought by an image height.

The vignetting of luminous flux can be brought by image height. This phenomenon is explained accompanying with FIG. 27. A light ray L3 passing through the top of luminous flux which forms an image on the center of a face of film 31 and a light ray L3' passing through the bottom of luminous flux are all directed to the AF sensor module with reflecting on the sub-mirror 16. To the contrary, a light ray L4' passing through the bottom of luminous flux which forms an image on a image height x is directed to the AF sensor module with reflecting on the sub-mirror 16, but a light ray L4 passing through the top of the luminous flux is not directed to the AF sensor module because of vignetting. Therefore, the luminous flux formed the image on the center of the face of film 31 is unsharped on the CCD as shown in FIG. 28(a) in defocus condition, while, the luminous flux which forms the image on some image height is unsharped, since a part of it is vignetted as shown in FIG. 28(b). Such as a vignetting of luminous flux brings bad influence to focus detecting. So, an amount of light lacked by vignetting luminous flux is weighted in accordance with a distance from a center of the CCD, and by which data obtained is stored in a camera body or lens.

Figure 29:
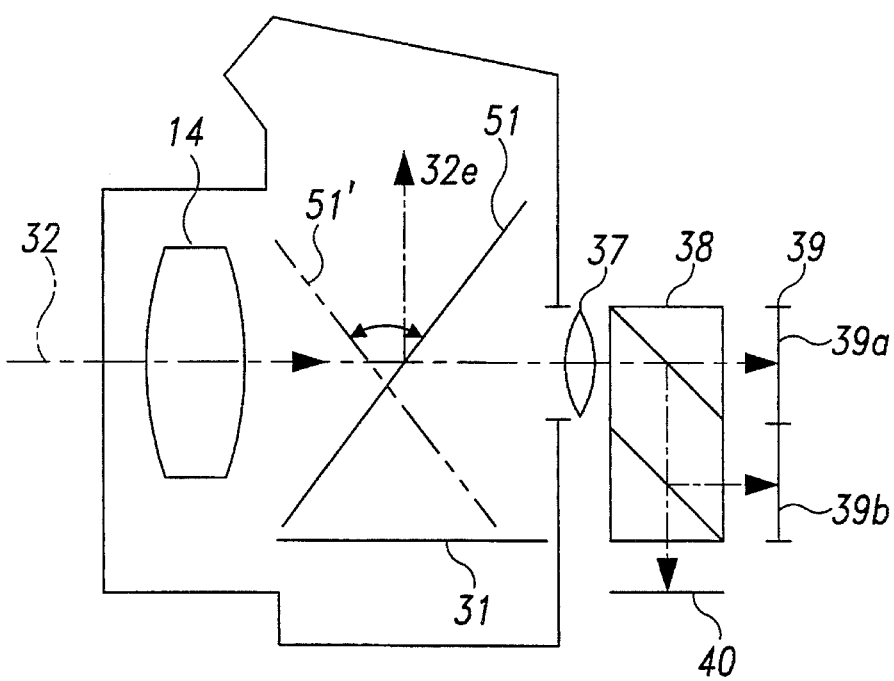
FIG. 29 is a view showing a modified example of a construction of arranging the AF module according to the second embodiment.

FIG. 29 shows a modified embodiment of the second embodiment and a construction of arranging an AF module is changed. In FIG. 29, the light 32 transmitting through the photographic lens 14 is divided by a pellicle mirror 51. The reflected light 32e is directed to a viewfinder and the transmitted light is directed to the AF sensor module. A construction of the optics for dividing optical path 38 and the like is as same as the above mentioned. In the modified embodiment, in exposure, the pellicle mirror 51 is shifted to a position of a pellicle mirror 51', and the light 32 is directed to the face of film 31. And a film is exposed. In this exposure, the transmitting light is directed to the AF sensor module, so it is possible to measure distance.

Figure 30:
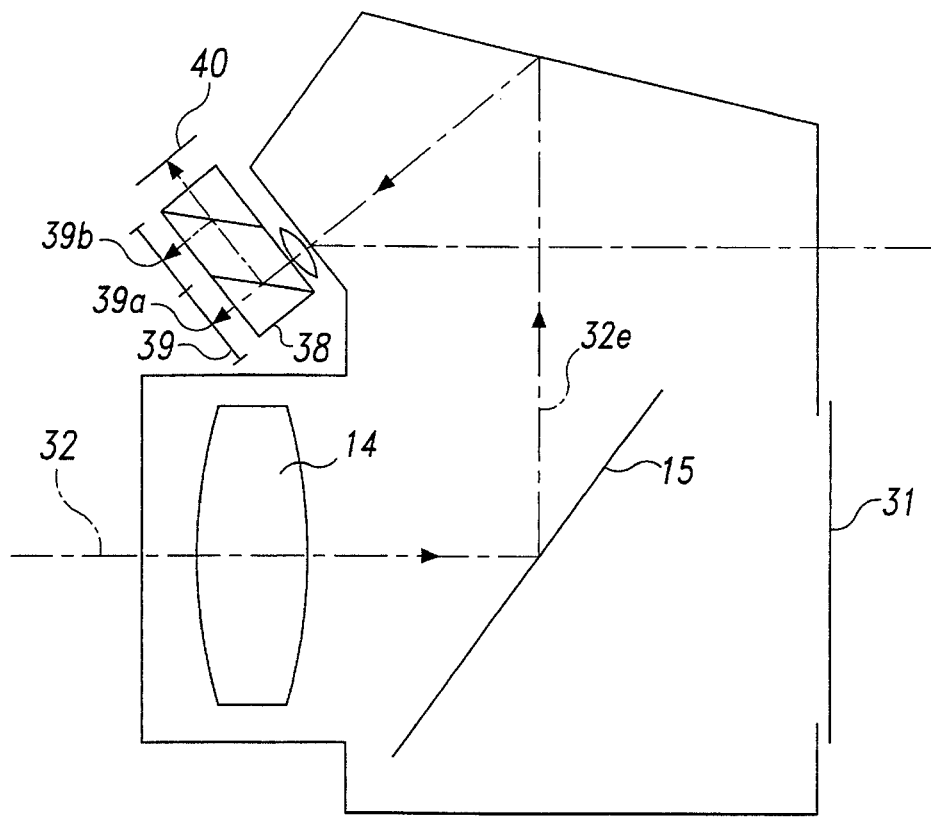
FIG. 30 is a view showing another modified example of the construction of arranging the AF module.

FIG. 30 shows another modified embodiment and a construction of arranging an AF sensor module is changed. In the modified embodiment, by dividing a light directed to a viewfinder, the light can be directed to the AF sensor module. A construction of the optics for dividing optical path 38 is as same as the above mentioned.

Figure 31:
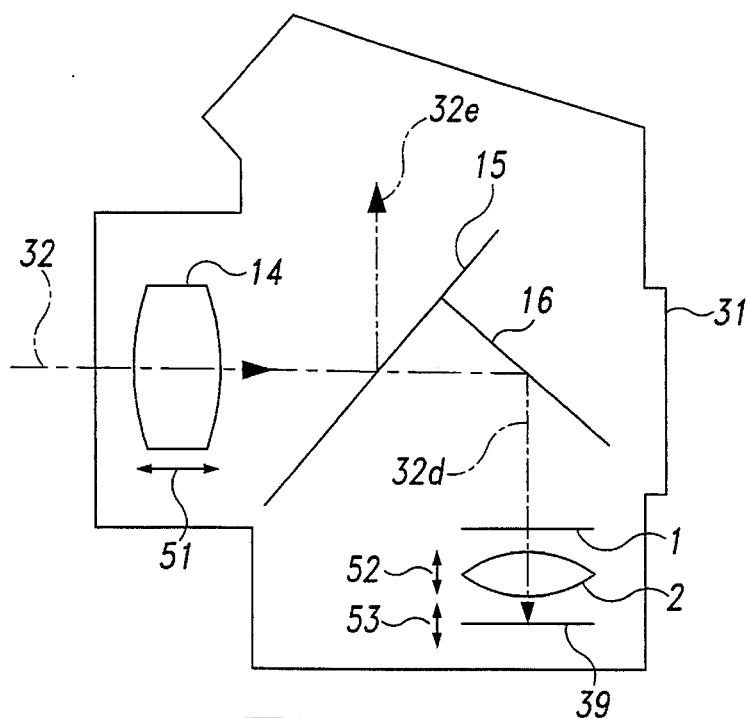
FIG. 31 is a view showing still another modified example of the construction of arranging the AF module.
Figure 32:
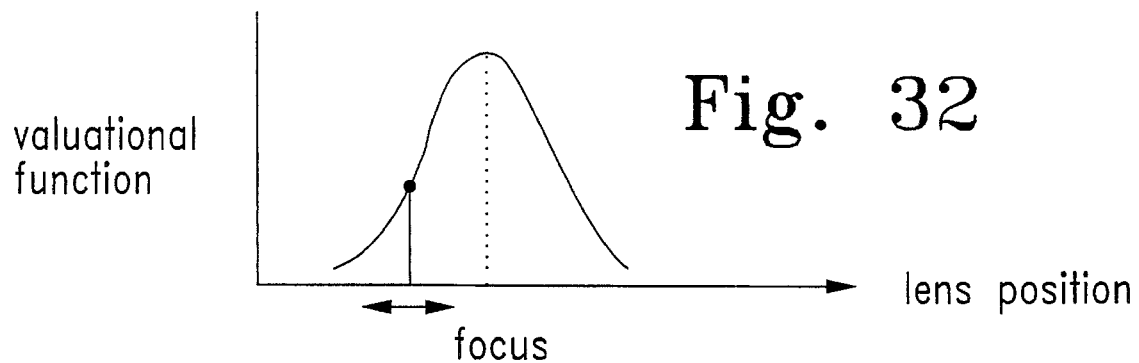
FIG. 32 is a view showing a relation between a lens position and a valuational function of an imaging signal.

FIG. 31 is still another modified embodiment in case of that the CCD 39 is only one piece. The direction of defocus (Dr) is not detected by the contrast detecting method in case of that the CCD 39 is only one piece. Therefore, by swinging the photographic lens 14 in front and rear, an imaging signal is obtained and, as shown in FIG. 32, a lens is driven in a direction of that valuational function based on ingredients in high frequency of the imaging signal grows higher. In short, by swinging the lens, the direction of defocus is detected. It is acceptable that the image reproducing lens 2 is swung up and down like an arrow 52 or the CCD 39 is swung up and down like an arrow 53.

Figure 33:
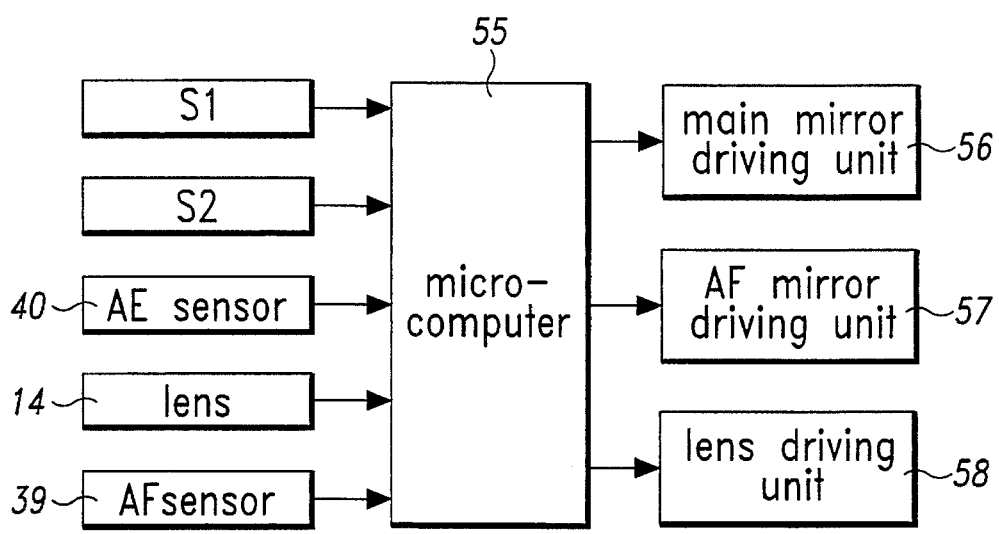
FIG. 33 is a block diagram for a focus detecting control in an embodiment of FIG. 21.
Figure 34:
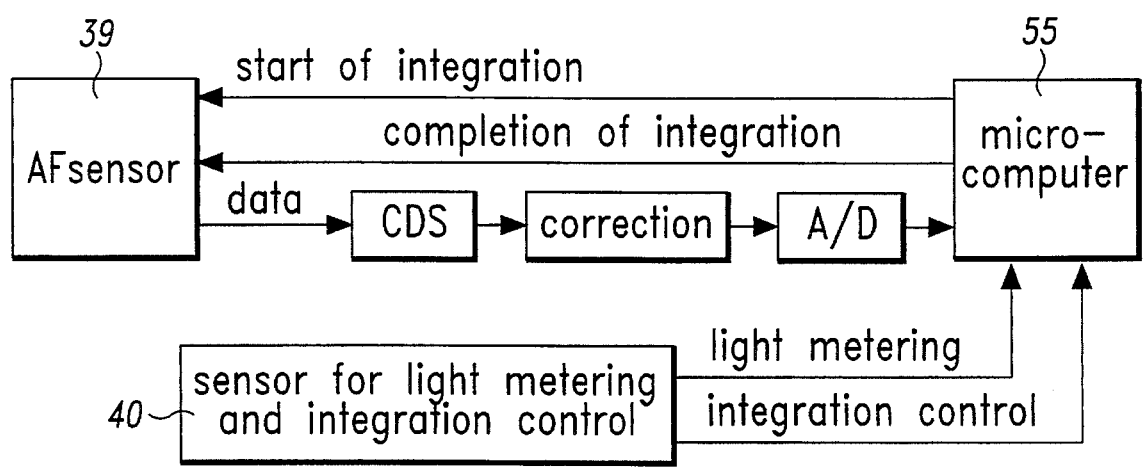
FIG. 34 is a detailed block diagram for the focus detecting control.

FIG. 33 shows a block diagram for focus detecting control in construction of FIG. 21. a microcomputer 55 takes signals from a switch S1, a release switch S2, the data of the lens 14, AF sensor (CCD) 39, the metering light sensor (AE sensor) 40 and the like, and drives a main mirror driving unit 56, AF mirror driving unit 57 and a lens driving unit 58. FIG. 34 is a functional block diagram of an the AF sensor 39, the AE sensor 40 and the microcomputer 55. The AE sensor 40 is also a monitor for integration control of metering light and the AF sensor 39.

Figure 35:
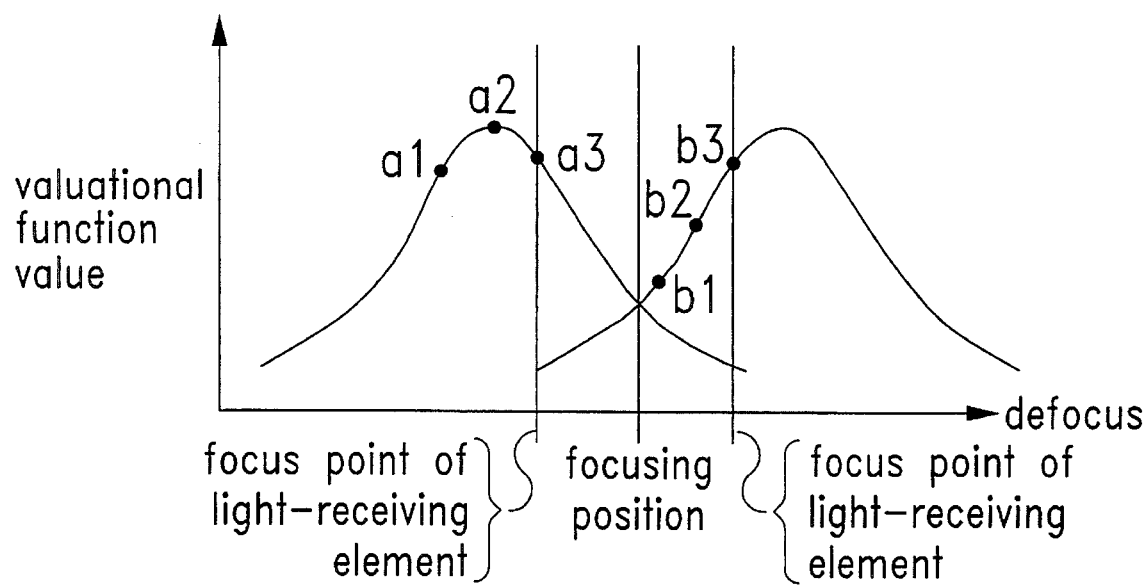
FIG. 35 is a view showing a relation between an amount of defocus and a valuational function in a focus detecting by the contrast detecting method.

FIG. 35 is a view showing the relation between the amount of defocus and valuational function in focus detecting by the contrast detecting method in case of that two area sensor (CCD) is arranged as the above embodiment shown in FIG. 20. When valuational values of two CCD are equal, it is focused (a3 and b3). Also, in case of defocus, based on a difference between valuational values calculated from two CCD, a direction of defocus (Dr) is detected. And second valuational value after driving the lens is calculated, an approximate value of valuational function is calculated with the first and second valuational values, then the highest value is calculated, and the lens is driven.

Figure 36A:
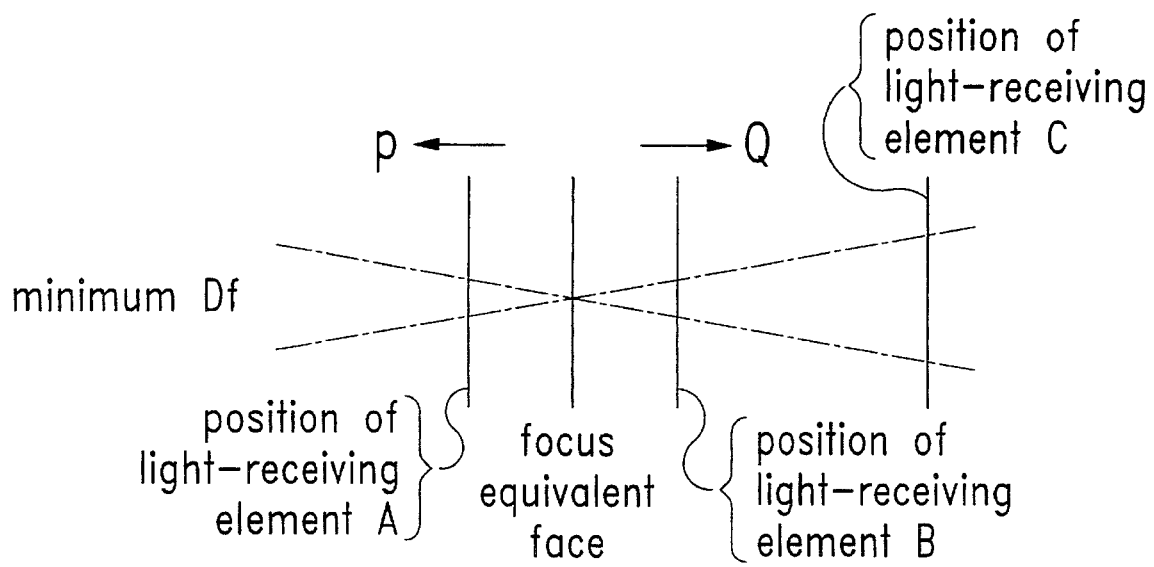
FIG. 36 (a), (b) and (c) are views explaining a process of focus detection by the contrast detecting method in accordance with a defocus amount.
Figure 36B:
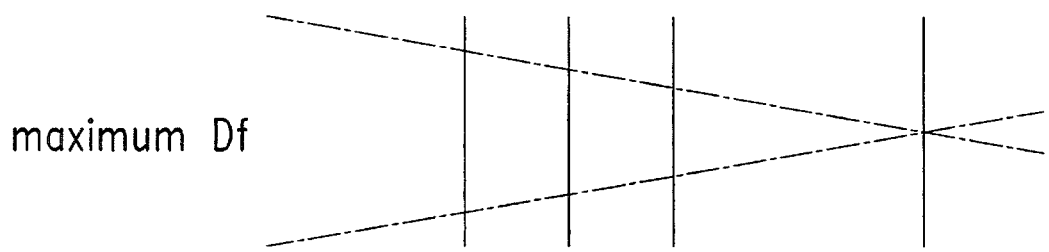
Figure 36C:
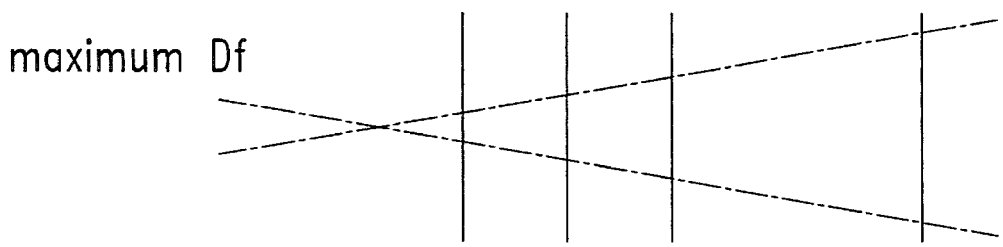

FIG. 36 is a view showing a process of focus detection by the contrast detecting method in accordance with the amount of defocus. In the embodiment of FIG. 20 as the above mentioned, by arranging the CCD 39a and 39b in front and rear of the film equivalent face, in case of small amount of defocus, the direction can be detected. This situation is shown in FIG. 36(a). Positions A and B of light-receiving elements correspond to the CCD 39a and 39b respectively. However, in case of large amount of defocus, since a formed image is unsharped on both the CCD 39a and 39b in FIG. 20, a direction of defocus is not detected. So, in construction of FIG. 21 as the above mentioned, by extending a length of an optical path with removing the mirror 41e, it is possible to detect the direction of defocus. This situation is shown in FIG. 36(b) and (c). Position C of light-receiving element corresponds to the CCD 39, in case of that the length of the optical path is extended. In FIG. 36(b), also, the direction of defocus is not detected owing to large amount of unsharp, it is clear that a focusing point is located in opposite side as shown in FIG. 36(c). As the above mentioned, it is possible to detect a direction of defocus even if an amount of defocus is large, therefore it is no need to swing a lens by means of a piezo element and the like.

Figure 37A:
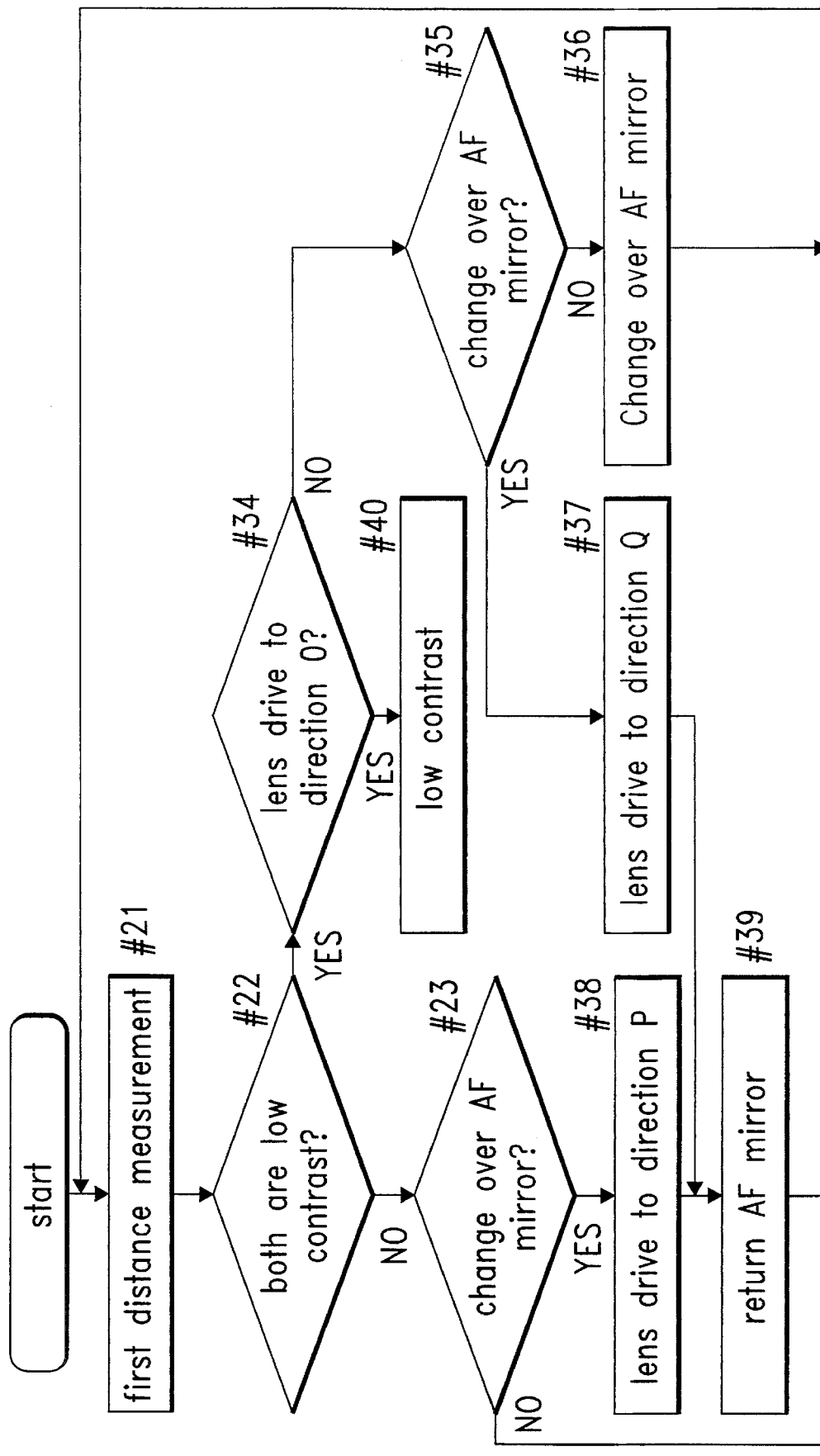
FIG. 37 is a flowchart showing a process of focus detecting in the embodiment of FIG. 21.
Figure 37B:
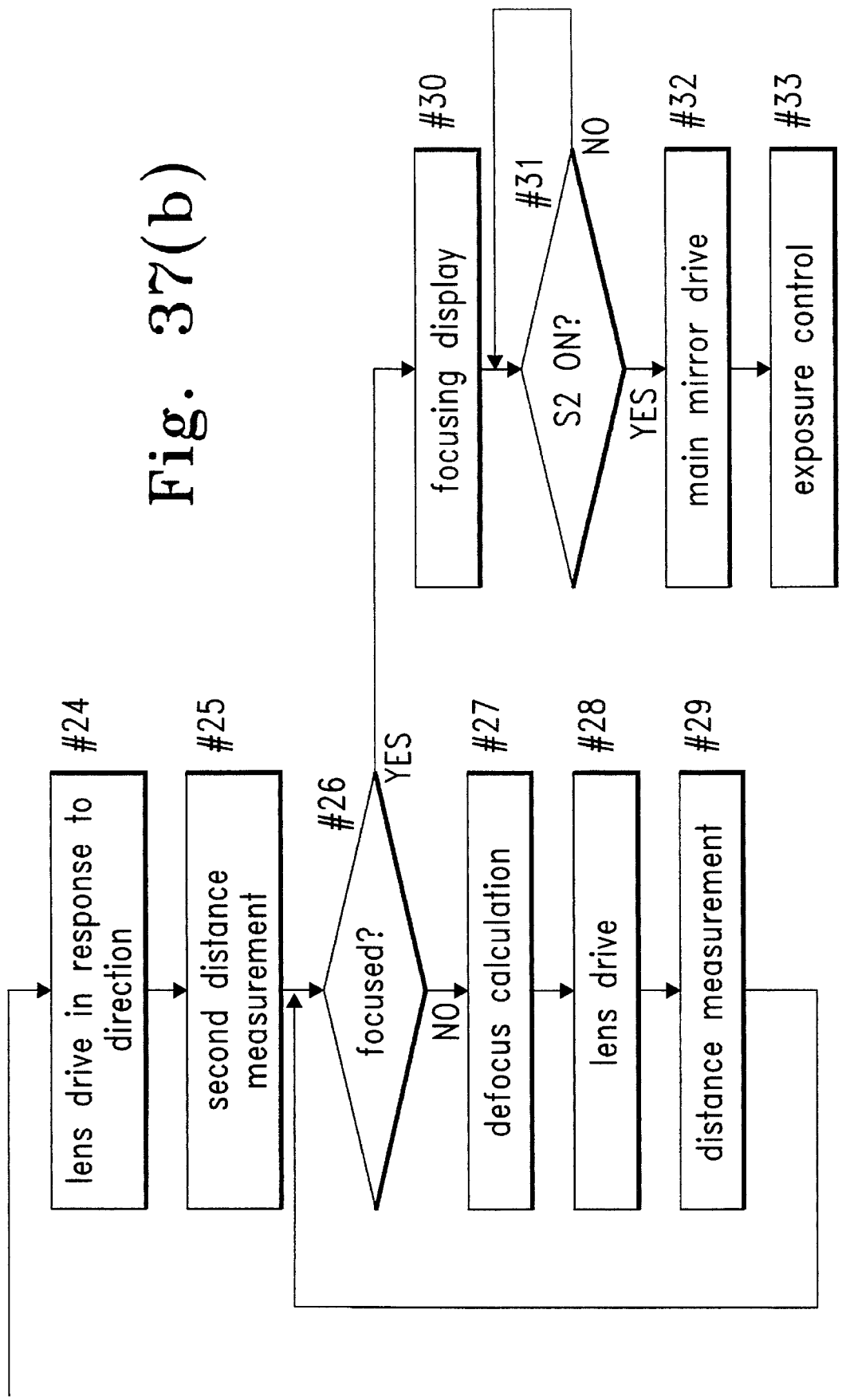

FIG. 37 is a flowchart showing a process of focus detecting in the embodiment of FIG. 21. Based on the first distance measurement at step #21, it is judged whether or not both of signals from two CCD shows a low contrast at step #22. If no, it is judged whether or not AF mirror (corresponds to the mirror 41e) is changed over at step #23. If no, in response to a direction of defocus, a lens is driven at step #24 and the second distance measurement is done at step #25. And it is judged whether it is focused or not at step #26. If no, defocus calculation is done at step #27, based on the defocus calculation, the lens is driven at step #28. And distance measurement is repeated till it is focused at step #29. If yes at step #26, after focusing is displayed at step #30, when the release switch S2 is turned on at step #31, the main mirror is driven at step #32 and exposure control is done at step #33.

If yes at step #22, it is judged that whether or not the lens is driven to a direction of an arrow Q in FIG. 36 at step #34. If no, it is judged whether or not the AF mirror is changed over at step #35. If no, the AF mirror is changed over and a length of an optical path is extended at step #36, and the procedure moves back to step #21 and repeats above mentioned process. If yes at step #35, the lens is driven to the direction of the arrow Q at step #37. And after the AF mirror is returned, namely, the length of the optical path is returned its former state at step #39, again, the procedure moves back to at step #21. Just after executing the above mentioned step #36, if no at step #22, the procedure goes to step #23. Then, since AF mirror has been changed over, the lens is driven to a direction of an arrow P in FIG. 36 at step #38. And after step #39, the procedure moves back to step #21. Also, after above mentioned step #37, if yes at step #22, the procedure goes to step #40 from step #34 and low contrast is determined.

Figure 38:
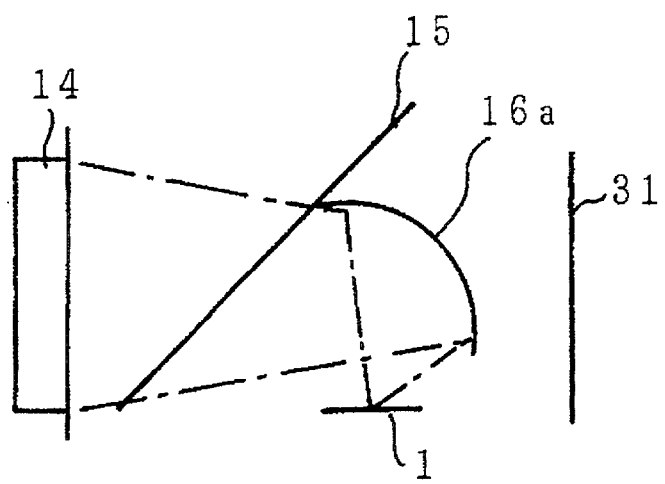
FIG. 38 is a view showing another modified example of the second embodiment.
Figure 39:
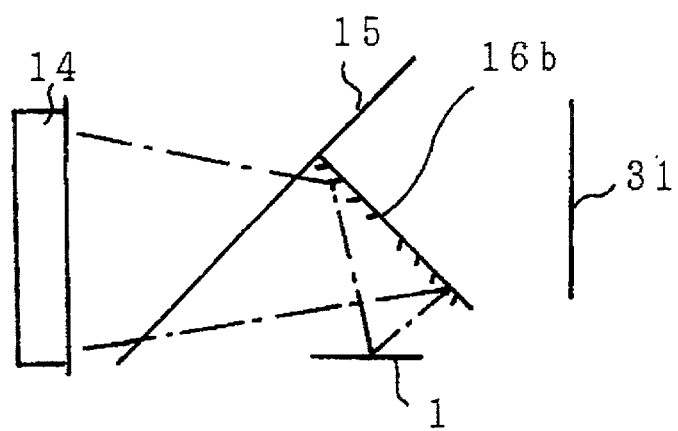
FIG. 39 is a view showing still another modified example of the second embodiment.

FIGS. 38 and 39 are still other modified embodiments of the second embodiment. To capable of detecting a direction and an amount of defocus in large area by the contrast detecting method, it is tend to extend a length of an optical path between a mirror and a sensor or to need larger sensor. However, the problems are solved by a construction as the below mentioned. In short, in FIG. 38, the sub-mirror 16a is a concave mirror, thereby an object image is more reduced and projected. Also, in FIG. 39, the sub-mirror 16b is a Fresnel lens, thereby the image object is more reduced than a film size. These constructions makes AF optics to be smaller.

Figure 40A:
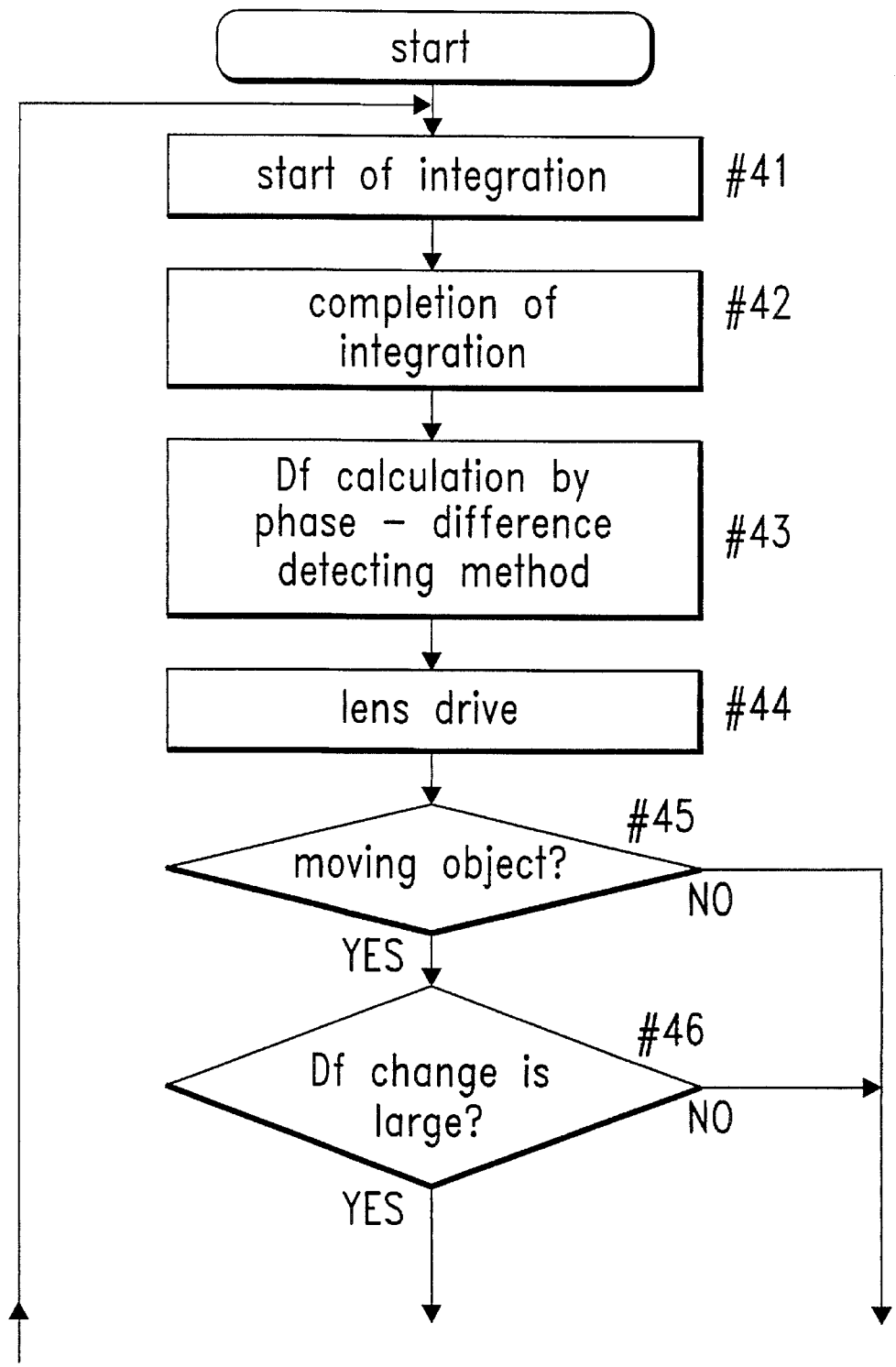
FIG. 40 is a flowchart showing another process of the auto focus detecting device.
Figure 40B:
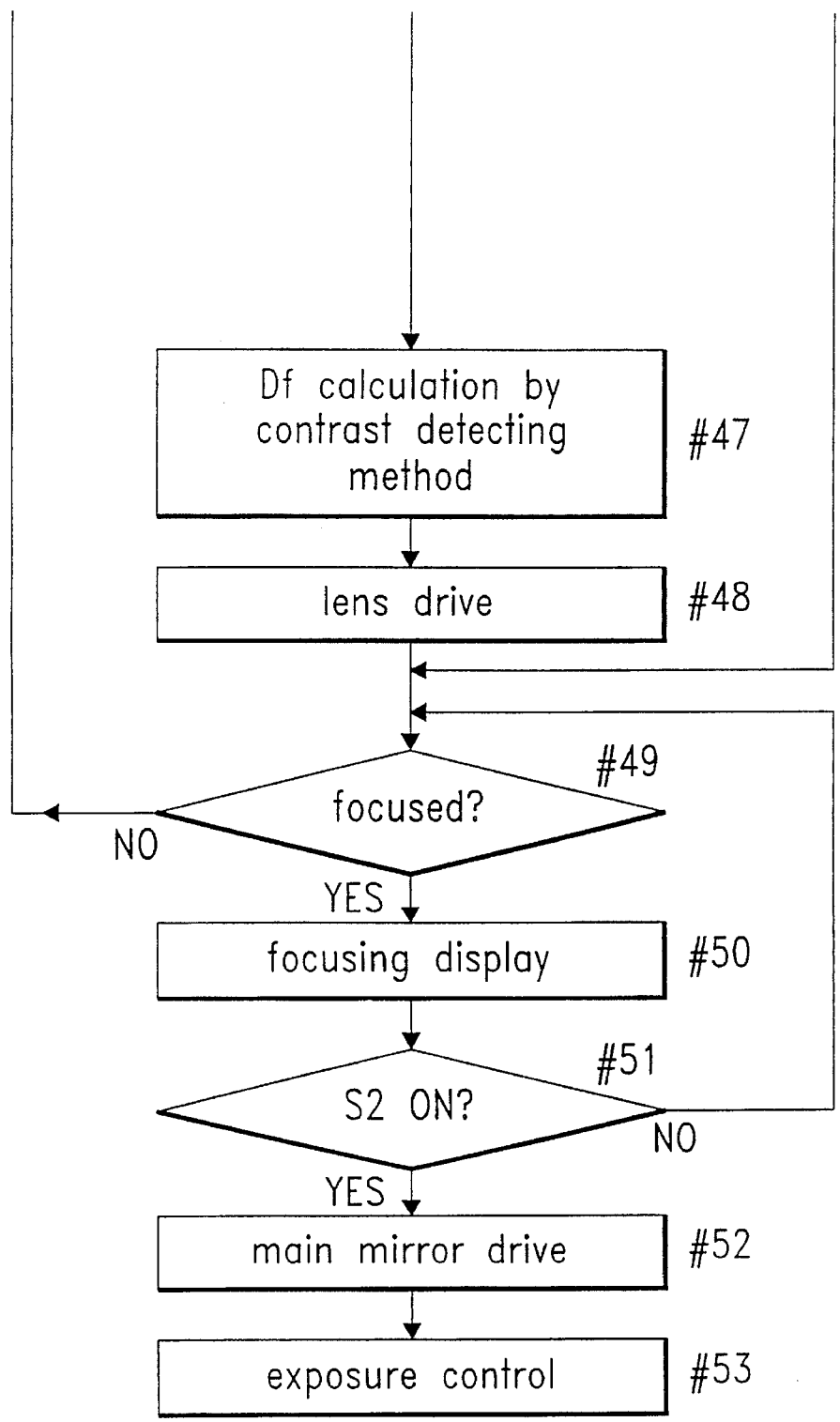

FIG. 40 is a flowchart showing a process of an auto focus detecting device of another embodiment (modified flowchart of FIG. 6). Starting a process of distance measurement, integration in a CCD is started at step #41. After completion of predetermined integration at step #42, an amount of defocus (Df) is calculated by the phase-difference detecting method at step #43. Based on the result, a lens is driven at step #44. Next, it is judged whether or not an object is a moving object at step #45. If yes, it is judged whether or not the amount of defocus change is large at step #46. if yes, it is supposed that the object is out of a distance measuring area by the phase-difference detecting method. In case of that, the amount of defocus is calculated by the contrast detecting method at step #47 and the lens is driven at step #48. If no at step #45 or step #46, the contrast detecting method is not used. Also, as the embodiment in FIG. 6, it is acceptable to calculate the amount of defocus by the contrast detecting method for adjusting in exactly. After step #48, it is judged whether or not it is focused at step #49 and if no, the procedure returns to #41. If yes, focusing is displayed at step #50. Till release switch (S2) is turned on the procedure is waited in a loop of #49–#51. When the release switch being turned on, a main mirror is driven at step #52 and an exposure is controlled at step #53.

Figure 41A:
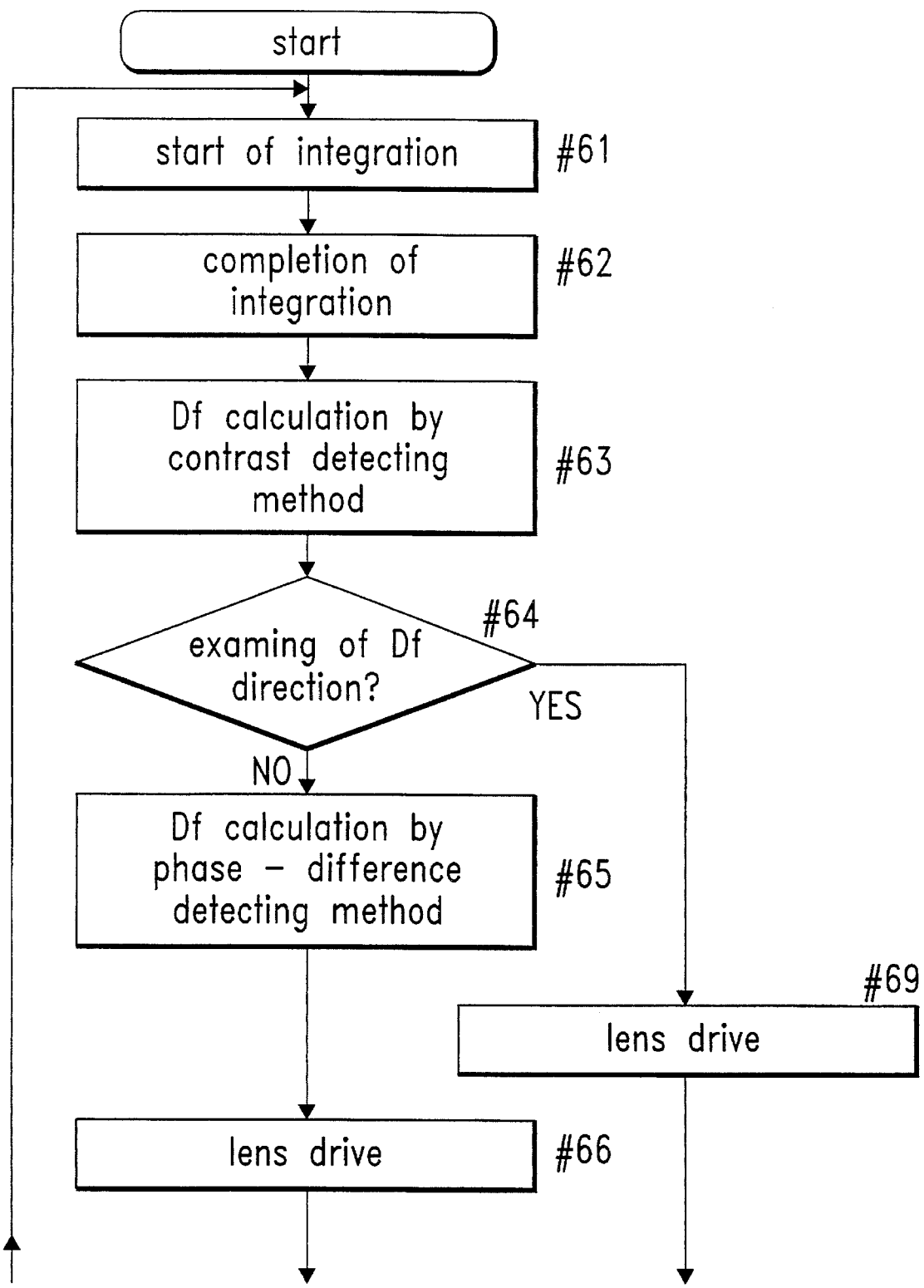
FIG. 41 is a flowchart showing still another process of the auto focus detecting device.
Figure 41B:
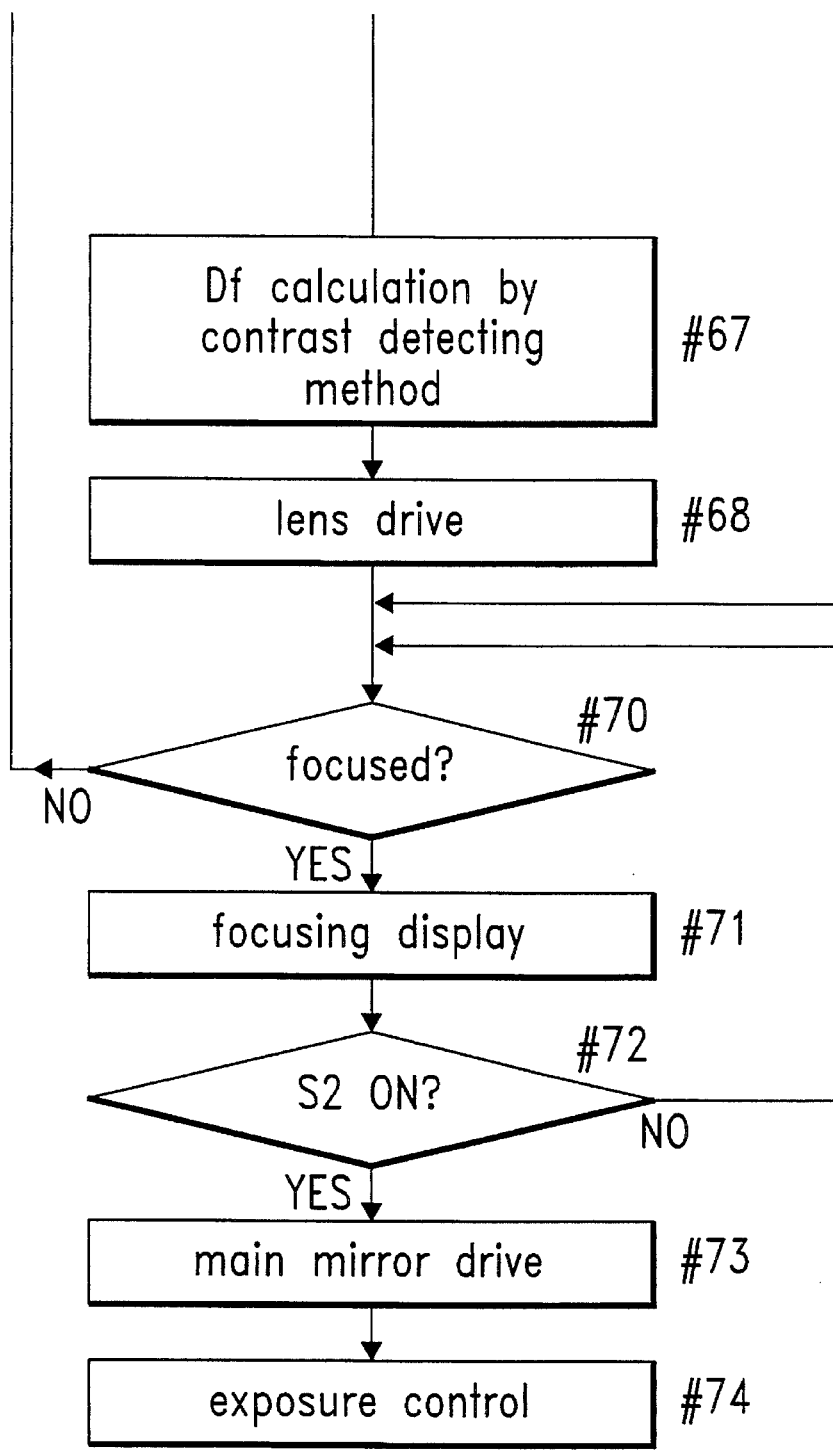

FIG. 41 is a flowchart showing a process of an auto focus detecting device of still another embodiment (further modified flowchart of FIG. 6). Starting a process of distance measurement, integration in a CCD is started at step #61. After completion of predetermined integration at step #62, an amount of defocus (Dr) is calculated by the contrast detecting method at step #63. Based on the result, it is judged that whether or not a direction of defocus can be detected at step #64. If yes, a lens is driven at step #69. If no, an amount of defocus is calculated by the phase-difference detecting method at step #65 and the lens is driven at step #66. Next, an amount of defocus is calculated by the contrast detecting method at step #67 as like in FIG. 6, then the lens is driven at step #68. And it is judged whether or not it is focused at step #70 and if no, the procedure returns to #61. If yes, focusing is displayed at step #71. Till release switch (S2) is turned on the procedure is waited in a loop of #70–#72. When the release switch being turned on, a main mirror is driven at step #73 and an exposure is controlled at step #74.

Figure 42:
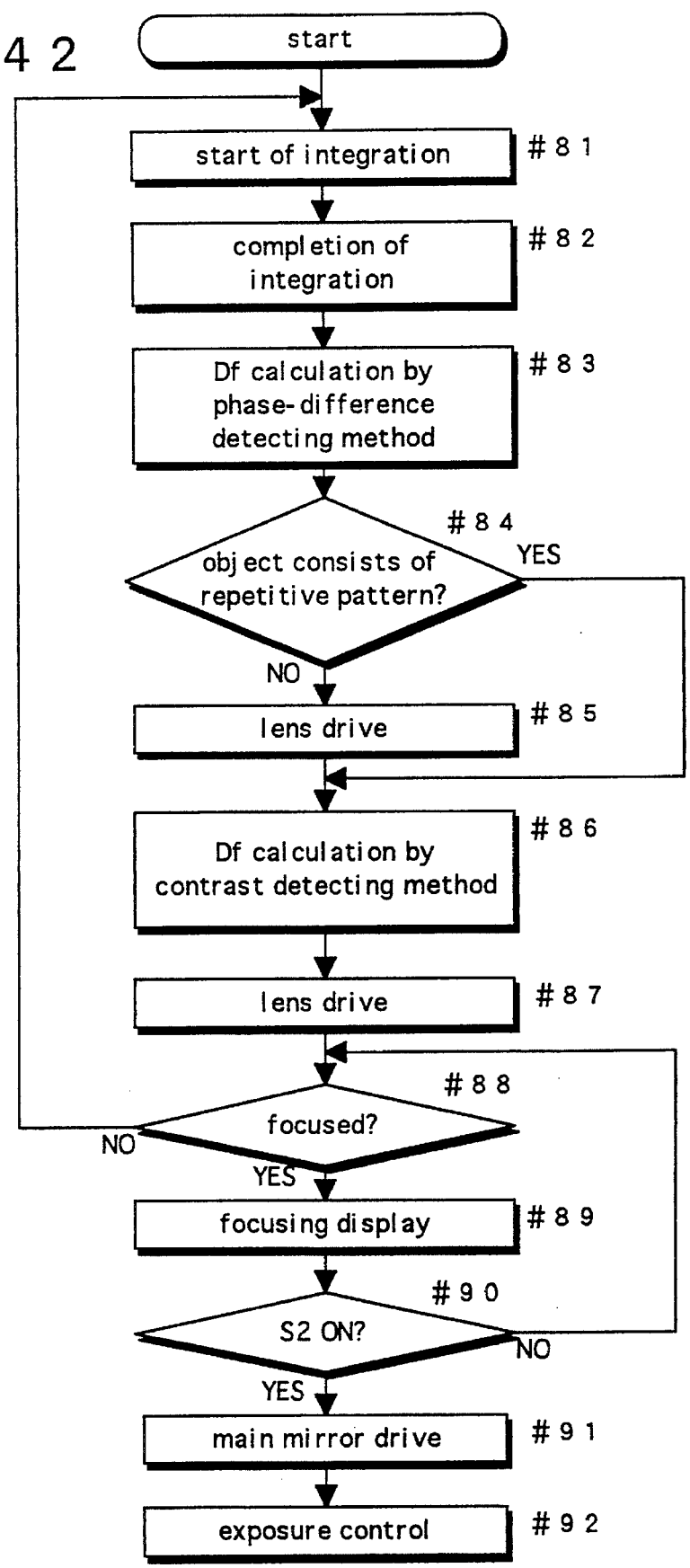
FIG. 42 is a flowchart showing still another process of the auto focus detecting device.

FIG. 42 is a flowchart showing a process of an auto focus detecting device of still another embodiment (further modified flowchart of FIG. 6). In case of that an object consists of repetitive pattern such as a striped pattern or a checked pattern, by the phase-difference detecting method, imprecise focus detection can not be obtained. In the present embodiment, in case of that an object having such as repetitive pattern, focus is detected by the contrast detecting method.

Starting a process of distance measurement, integration in the CCD is started at step #81. After completion of predetermined integration at step #82, an amount of defocus (Df) is calculated by the phase-difference detecting method at step #83. Based on the result, it is judged that whether or not an object consists repetitive pattern at step #84. If no, a lens is driven at step #85 and the amount of defocus is detected by the contrast detecting method at step #86. If yes, without driving the lens, the procedure goes to step #86 and the amount of defocus is calculated by the contrast detecting method. Next, based on the data of the amount of defocus, the lens is driven at step #87. And it is judged whether or not it is focused at step #88, and if no, the procedure returns to #81. If yes, focusing is displayed at step #89. Till release switch (S2) is turned on the procedure is waited in a loop of #70–#72. When the release switch being turned on, a main mirror is driven at step #91 and an exposure is controlled at step #92.

Figure 43:
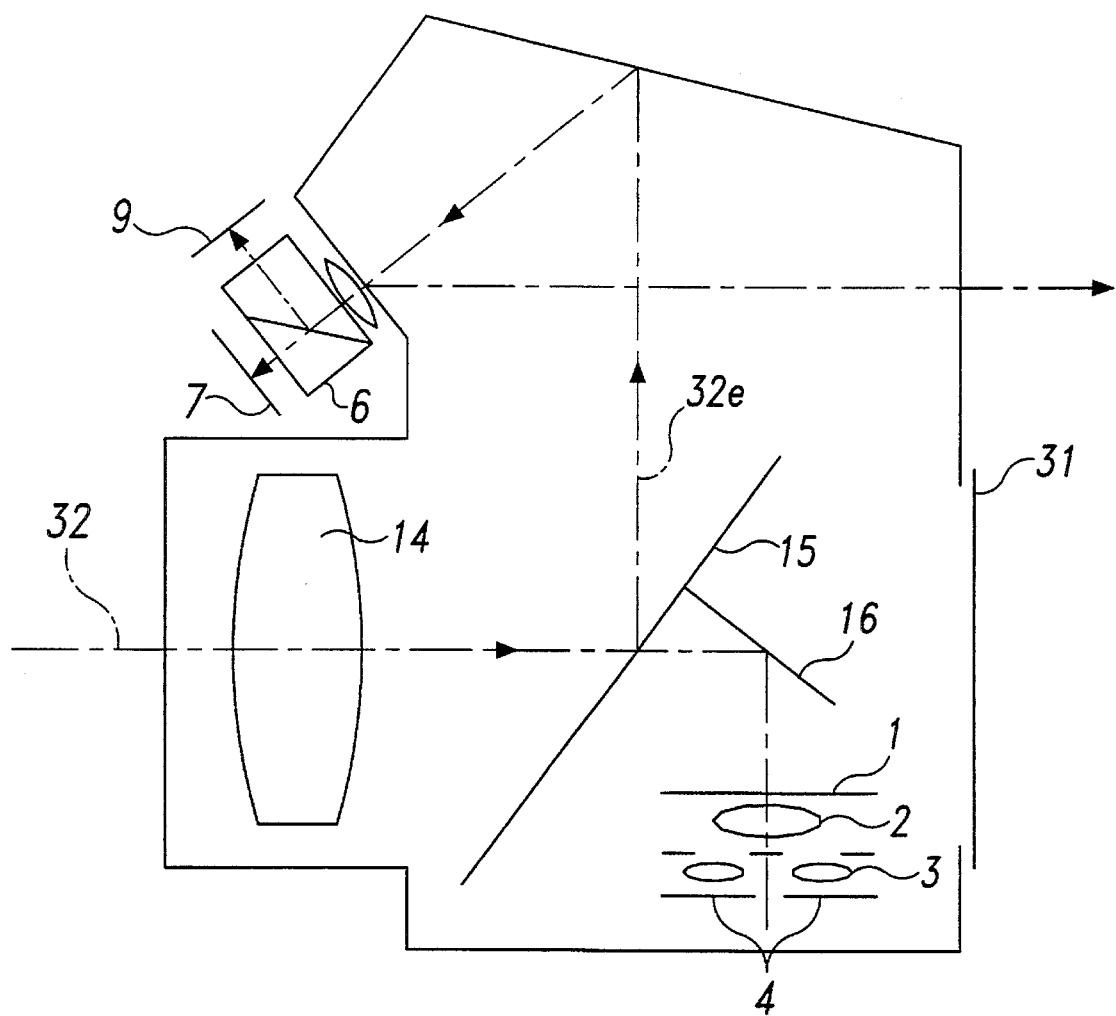
FIG. 43 is a view showing another modified example of an arranging construction of the AF module.

FIG. 43 is a view showing another modified example of an arranging construction of an AF sensor module (modified flowchart of FIGS. 1 and 2). In FIG. 43, the AF sensor module for the phase-difference detecting method is arranged in the bottom of a body and a light is directed by the sub-mirror 16. While, an AF sensor module for the contrast detecting method is arranged nearby the pentagonal mirror which construct the viewfinder. And, with dividing the light directed to the viewfinder, the light directed to the area sensor 7 for focus detecting by the contrast detecting method and the light metering sensor 9.

The invention may be embodied in other specific forms without departing from the spirit or essential characteristics thereof. The present embodiment is therefore to be considered in all respects as illustrative and not restrictive.

What is claimed is:

1. An auto focus detecting device comprising;

first image pick up means which converts an object image formed on an imaging face to an electric signal;

first detecting means which detects focus condition by a phase-difference detecting method based on output from the first image pick up means;

second image pick up means which converts the object image formed on the imaging face to an electric signal;

second detecting means which detects focus condition by a contrast detecting method based on an output from the second image pick up means; and calculating means which calculates an amount of defocus based on output from the first detecting means and the second detecting means.

2. An auto focus detecting device as claimed in claim 1, further comprising;

selecting means which selects the first detecting means or the second detecting means in accordance with a condition of the object; and said calculating means which calculates the amount of defocus based on an output from the detecting means selected by the selecting means.

3. An auto focus detecting device as claimed in claim 1, wherein the second detecting means detects a focus condition at higher precision than that of the first detecting means.

4. An auto focus detecting device as claimed in claim 1, wherein the second detecting means detects the focus condition in an area that the first detecting means can not detect within.

5. An auto focus detecting device as claimed in claim 1, further comprising;

light dividing optics which divides light from the object and directing the divided light to the first image pick up means and the second image pick up means respectively.

6. An auto focus detecting device as claimed in claim 5, further comprising;

light-receiving elements which converts an incident light to an electric signal in accordance with a strength of the light;

light metering means which meters luminance of the object based on an output from the light-receiving elements; and said light dividing optics which also directs the light to the light-receiving elements.

7. An auto focus detecting device comprising;

first image pick up means which converts an object image formed on an image pick up face to an electric signal;

first detecting means which detects a focus condition by a phase-difference detecting method based on an output from the first image pick up means;

second image pick up means which converts an object image formed on an imaging face to an electric signal;

second detecting means which detects a focus condition by a contrast detecting method based on an output from the second image pick up means;

judging means which judges whether or not the first detecting means can detect a focus condition by phase-difference detecting method; and calculating means which calculates an amount of defocus based on output from the second detecting means, when the judging means judges that the focus condition can not be detected by the first detecting means.

8. An auto focus detecting device as claimed in claim 7, wherein the judging means judges whether or not contrast of the object image formed on the imaging face of the first detecting means is low, and in low contrast, it judges that the focus condition can not be detected.

9. An auto focus detecting device as claimed in claim 7, wherein the judging means judges whether or not the object image formed on the imaging face of the first image image pick up means consists of repetitive pattern, and in consisting of repetitive pattern, it judges that the focus condition can not be detected.

10. An auto focus detecting device comprising;

first image pick up means which converts an object image formed on an imaging face to an electric signal;

first detecting means which detects a focus condition by a phase-difference detecting method based on an output from the first image pick up means;

second image pick up means which converts an object image formed on an imaging face to an electric signal;

second detecting means which detects a focus condition by a contrast detecting method based on output from the second image pick up means;

judging means which judges whether or not the second detecting means can detect the focus condition by the contrast detecting method; and calculating means which calculates an amount of defocus based on an output from the first detecting means, when the judging means judges that the focus condition can not be detected by the second detecting means.

11. An auto focus detecting device as claimed in claim 10, wherein the judging means judges whether or not the second detecting means can detect a defocus direction of a focusing position, and when defocus direction being not detected, judges that the focus condition can not be detected.

12. An auto focus adjusting device comprising:

a photosensor which converts an object image formed on a light-receiving surface to an electric signal;

a first detecting device which detects a focus condition by a phase-difference detecting method based on an output from the photosensor;

a second detecting device which detects a focus condition by a contrast detecting method based on an output from the photosensor; and an adjusting device which adjusts the focus condition based on output from the first detecting device and the second detecting device.

13. An auto focus adjusting device as claimed in claim 12, further comprising:

a selecting device which selects the first detecting device or the second detecting device in accordance with a condition of the object, wherein said adjusting device adjusts the focus condition based on an output from the detecting device selected by the selecting device.

14. An auto focus adjusting device as claimed in claim 12, further comprising:

a calculator which calculates an amount of defocus based on output from the first detecting device and the second detecting device, wherein said adjusting device adjusts the focus condition based on the amount of defocus calculated by the calculator.

15. An auto focus adjusting device comprising:

a photosensor which converts an object image formed on a light-receiving surface to an electric signal;

a first detecting device which detects a focus condition by a phase-difference detecting method based on an output from the photosensor;

a second detecting device which detects a focus condition by a contrast detecting method based on an output from the photosensor;

a judging device which judges whether or not the first detecting device can detect a focus condition by the phase-difference detecting method; and an adjusting device which adjusts the focus condition based on output from the second detecting device when the judging device judges that the first detecting device cannot detect the focus condition.

16. An auto focus adjusting device as claimed in claim 15, wherein said judging device judges that the first detecting device cannot detect the focus condition when the object image consists of a repetitive pattern.

17. An auto focus adjusting device as claimed in claim 15, further comprising:

a calculator which calculates an amount of defocus based on output from the second detecting device, wherein said adjusting device adjusts the focus condition based on the amount of defocus calculated by the calculator.

18. An auto focus adjusting device comprising:

a photosensor which converts an object image formed on a light-receiving surface to an electric signal;

a first detecting device which detects a focus condition by a phase-difference detecting method based on an output from the photosensor;

a second detecting device which detects a focus condition by a contrast detecting method based on an output from the photosensor;

a judging device which judges whether or not the second detecting device can detect a focus condition by the contrast detecting method; and an adjusting device which adjusts the focus condition based on output from the first detecting device when the judging device judges that the second detecting device cannot detect the focus condition.

19. An auto focus adjusting device as claimed in claim 18, wherein said judging device judges that the second detecting device cannot detect the focus condition when a defocus direction of a focus position cannot be detected.

20. An auto focus adjusting device as claimed in claim 18, further comprising:

a calculator which calculates an amount of defocus based on output from the first detecting device, wherein said adjusting device adjusts the focus condition based on the amount of defocus calculated by the calculator.

* * * * *